US012732688B2

(12) United States Patent
Liu

(10) Patent No.: US 12,732,688 B2
(45) Date of Patent: Sep. 8, 2026

(54) SHOOTING METHOD, ELECTRONIC DEVICE AND STORAGE MEDIUM

(71) Applicant: Honor Device Co., Ltd., Shenzhen (CN)

(72) Inventor: Hu Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 230 days.

(21) Appl. No.: 18/712,111

(22) PCT Filed: Dec. 1, 2023

(86) PCT No.: PCT/CN2023/135984
§ 371 (c)(1),
(2) Date: May 21, 2024

(87) PCT Pub. No.: WO2024/179096
PCT Pub. Date: Sep. 6, 2024

(65) Prior Publication Data

US 2026/0172666 A1 Jun. 18, 2026

(30) Foreign Application Priority Data

Feb. 27, 2023 (CN) ......................... 202310222758.9

(51) Int. Cl.
*H04N 23/63* (2023.01)
*H04N 23/71* (2023.01)

(52) U.S. Cl.
CPC ........... *H04N 23/632* (2023.01); *H04N 23/71* (2023.01)

(58) Field of Classification Search
CPC .... H04N 23/632; H04N 23/71; H04N 23/667; H04N 23/80; H04N 23/951;
(Continued)

(56) References Cited

U.S. PATENT DOCUMENTS 8,063,944 B2 11/2011 Kido
8,284,270 B2 * 10/2012 Tezuka ................ H04N 1/2145 348/229.1

(Continued)

FOREIGN PATENT DOCUMENTS

CN 101322397 A 12/2008
CN 108234894 A 6/2018

(Continued)

*Primary Examiner* — Pritham D Prabhakher
(74) *Attorney, Agent, or Firm* — Conley Rose, P.C.

(57) ABSTRACT

A shooting method, an electronic device and a storage medium. In the method, a user starts a camera application, an image control algorithm can be executed based on a first convergence speed, and an image control parameter can be obtained, to adjust parameters, such as luminance and sharpness, of an image. After the user presses a shooting button, the convergence speed of the image control algorithm is increased, for example, the image control algorithm is executed at a second convergence speed, to accelerate convergence of the image parameters, when the user lifts the shooting button, the parameters such as luminance and sharpness of the image can converge to a pre-configured parameter interval. In this way, when a user lifts a shooting button, the camera can be directly triggered to shoot, to avoid a shooting delay and improve shooting performance of the device.

20 Claims, 12 Drawing Sheets

(58) Field of Classification Search
CPC .... H04N 1/2145; H04N 1/215; H04N 5/2621; H04N 5/772; H04N 9/8042; H04N 9/8047; H04N 9/8205; H04N 9/8227; H04N 9/8233; H04N 2101/00
USPC .................................................... 348/333.11
See application file for complete search history.

(56) References Cited

U.S. PATENT DOCUMENTS

| | | | | |
|---|---|---|---|---|
| 8,325,890 | B2 * | 12/2012 | Price | H04N 23/76 348/14.02 |
| 9,715,903 | B2 * | 7/2017 | Gupte | G11B 27/3081 |
| 9,961,270 | B2 * | 5/2018 | Sakai | A61B 1/00013 |
| 10,324,357 | B2 * | 6/2019 | Paliy | H04N 23/62 |
| 10,728,464 | B2 * | 7/2020 | Hashigami | H04N 23/73 |
| 11,159,739 | B2 * | 10/2021 | Kim | H04N 23/74 |
| 11,297,249 | B2 * | 4/2022 | Yonemochi | H04N 23/651 |
| 11,863,884 | B2 * | 1/2024 | Galor Gluskin | G06K 19/06037 |
| 12,223,663 | B2 * | 2/2025 | Gintsburg | G06T 7/246 |
| 12,302,002 | B2 * | 5/2025 | Lee | H04N 23/667 |
| 2004/0155977 | A1 | 8/2004 | Clark et al. | |
| 2010/0026843 | A1 | 2/2010 | Tezuka et al. | |
| 2011/0298886 | A1 | 12/2011 | Price et al. | |
| 2013/0208165 | A1 * | 8/2013 | An | H04N 23/63 348/333.05 |
| 2015/0097984 | A1 * | 4/2015 | Chen | H04N 23/81 348/223.1 |
| 2015/0364158 | A1 * | 12/2015 | Gupte | H04N 5/144 386/223 |
| 2017/0302837 | A1 | 10/2017 | Sakai | |
| 2018/0102846 | A1 * | 4/2018 | Aoyama | G06F 16/51 |
| 2019/0086766 | A1 * | 3/2019 | Paliy | H04N 23/75 |
| 2019/0109971 | A1 | 4/2019 | Hashigami et al. | |
| 2020/0053273 | A1 * | 2/2020 | Kim | H04N 23/61 |
| 2020/0053276 | A1 * | 2/2020 | Kim | G06V 20/20 |
| 2020/0412929 | A1 * | 12/2020 | Yonemochi | H04N 25/51 |
| 2022/0138964 | A1 * | 5/2022 | Gintsburg | G06T 7/246 382/103 |
| 2022/0337730 | A1 | 10/2022 | Lee et al. | |
| 2023/0015621 | A1 * | 1/2023 | Feng | H04N 23/71 |
| 2023/0080715 | A1 * | 3/2023 | Galor | G06V 10/70 348/301 |

FOREIGN PATENT DOCUMENTS

| | | | |
|---|---|---|---|
| CN | 109819172 | A | 5/2019 |
| CN | 110798627 | A | 2/2020 |
| CN | 112788250 | A | 5/2021 |
| CN | 113329176 | A | 8/2021 |
| CN | 113382169 | A | 9/2021 |
| CN | 113905182 | A | 1/2022 |
| CN | 114125312 | A | 3/2022 |
| CN | 116389885 | A | 7/2023 |
| JP | 2003008984 | A | 1/2003 |
| JP | 2008164731 | A | 7/2008 |
| JP | 2014110596 | A | 6/2014 |
| JP | 2018007233 | A | 1/2018 |
| KR | 20080057048 | A | 6/2008 |

* cited by examiner

SHOOTING METHOD, ELECTRONIC DEVICE AND STORAGE MEDIUM

CROSS-REFERENCE TO RELATED APPLICATIONS

This is a national stage of International Application No. PCT/CN2023/135984 filed on Dec. 1, 2023, which claims priority to Chinese Patent Application No. 202310222758.9, filed on Feb. 27, 2023, both of which are incorporated herein by reference in their entireties.

TECHNICAL FIELD

This application relates to the field of terminal technologies, and in particular, to a shooting method, an electronic device, and a storage medium.

BACKGROUND

When a user uses an electronic device having a shooting function, such as a single lens reflex camera or a smartphone, to shoot a person or object in a moving state, the user usually expects to be able to capture image content on a device preview interface when a shooting button is pressed. However, in practical applications, when a user presses a shooting button, the user is affected by a shutter lag (shutter lag) of a camera, and an actual shooting result is inconsistent with the image content desired by the user.

One of main causes of the shutter lag is that automatic exposure (AE) does not converge. The AE refers to that the camera automatically adjusts exposure of the camera based on strength of shooting ambient light, to prevent overexposure or underexposure, and only when AE converges, the camera triggers shooting. In different shooting environments, slow convergence speed of the AE will lead to delayed shooting, and how to improve shooting performance of the camera is a problem to be solved urgently at present.

SUMMARY

Embodiments of this application provide a shooting method, an electronic device, and a storage medium, to improve capture performance of a device.

According to a first aspect, an embodiment of this application provides a shooting method. The method may be applied to an electronic device that has shooting and displaying functions. The shooting method includes: displaying a first image frame and a second image frame before a first moment, wherein at the first moment, the electronic device detected a first operation of pressing a shooting button by a user, and the first image frame and the second image frame are adjacent image frames;

- displaying a third image frame and a fourth image frame between the first moment and a second moment, wherein at the second moment, the electronic device detected a second operation of lifting the shooting button by the user, and the third image frame and the fourth image frame are adjacent image frames;
- at the third moment, obtaining a shot fifth image frame, where
- the second moment is later than the first moment, and the third moment is later than the second moment; and a luminance change speed of the third image frame and the fourth image frame is greater than a luminance change speed of the first image frame and the second image frame.

In the above solution, the first image frame and the second image frame are adjacent image frames displayed by the device in a preview state, the third image frame and the fourth image frame are adjacent image frames displayed by the device in a shooting state triggered by the user, and the fifth image frame is an image frame collected by the device at a moment at which the user lifts the shooting button. A luminance change of adjacent image frames in the shooting stage triggered by the user is greater than a luminance change of adjacent image frames in the preview stage, which indirectly indicates a speed at which a bottom layer of the device adjusts luminance of an image frame in the shooting state triggered by the user is greater than a speed at which the bottom layer of the device adjusts luminance of an image frame in the preview stage. To be specific, in the shooting state triggered by the user, a convergence speed of an algorithm for adjusting luminance of an image frame is accelerated by the device. In this way, image luminance of the fifth image frame collected by the device can converge to a luminance interval corresponding to a current shooting environment, so that the device can be triggered to shoot at the third moment to obtain the fifth image frame, and an image frame actually shot by the device is an image frame collected by the device at a shooting moment triggered by the user. This reduces a shooting delay and improves shooting experience of the user.

In an optional embodiment of the first aspect of this application, the displaying a first image frame and a second image frame includes:

- obtaining, by an image control module of the electronic device, a sixth image frame from an image sensor of the electronic device, where the sixth image frame is an image frame before the first image frame and the second image frame;
- when the image control module determines that an image parameter of the sixth image frame does not converge to a first target parameter interval, executing, by the image control module, an image control algorithm at a first convergence speed to obtain a first image control parameter;
- collecting, by the image sensor, the first image frame and the second image frame based on the first image control parameter; and
- displaying, by the electronic device, the first image frame and the second image frame.

In the solution above, the electronic device displays the first image frame and the second image frame on a shooting preview interface, the first image frame and the second image frame may be collected based on a first image control parameter determined based on a sixth image frame before the first image frame and the second image frame. The image control module of the electronic device adjusts image parameters of the first image frame and the second image frame after the sixth image frame by analyzing the image parameters of the sixth image frame, for example, image luminance, sharpness, and white balance of the sixth image frame, so that the image parameters of the first image frame and the second image frame can converge to an image parameter interval corresponding to a current shooting environment as soon as possible.

In an optional embodiment of the first aspect of this application, the displaying a third image frame and a fourth image frame includes:

- obtaining, by the image control module of the electronic device, a seventh image frame from the image sensor of the electronic device, where the seventh image frame is an image frame before the third image frame and the fourth image frame;

when the image control module determines that an image parameter of the seventh image frame does not converge to the first target parameter interval, executing, by the image control module, an image control algorithm at a second convergence speed to obtain a second image control parameter, where the second convergence speed is greater than the first convergence speed;

collecting, by the image sensor, the third image frame and the fourth image frame based on the second image control parameter; and displaying, by the electronic device, the third image frame and the fourth image frame.

In the solution above, the electronic device displays the third image frame and the fourth image frame on a shooting preview interface, the third image frame and the fourth image frame may be collected based on a second image control parameter determined based on a seventh image frame before the third image frame and the fourth image frame. The image control module of the electronic device adjusts image parameters of the third image frame and the fourth image frame after the seventh image frame by analyzing the image parameters of the seventh image frame, for example, image luminance, sharpness, and white balance of the seventh image frame, so that the image parameters of the third image frame and the fourth image frame can converge to the image parameter interval corresponding to a current shooting environment as soon as possible. It should be noted that, in this embodiment, during the time period in which the user presses the shooting button and the user lifts the shooting button, the image control module increases the convergence speed of executing the image control algorithm, so that the image parameter of the fifth image frame collected by the device at a moment at which the user lifts the shooting button can converge to a better level, reducing the shooting delay.

In an optional embodiment of the first aspect of this application, the executing, by the image control module, an image control algorithm at a second convergence speed to obtain a second image control parameter includes:

executing, by the image control module, the image control algorithm at the second convergence speed by invoking a first interface to obtain the second image control parameter, where the second convergence speed is configured on the first interface.

In the solution, the first interface is a newly configured interface, and before executing the image control algorithm, the image control module adjusts the convergence speed of the image control algorithm by invoking the first interface, to accelerate adjustment of an image parameter of a subsequent image frame, so that the image parameter of the subsequent image frame converges as soon as possible.

In an optional embodiment of the first aspect of this application, the shooting method further includes:

after the third moment, displaying an eighth image frame and a ninth image frame, where the eighth image frame and the ninth image frame are adjacent image frames; and the luminance change speed of the third image frame and the fourth image frame is greater than a luminance change speed of the eighth image frame and the ninth image frame.

A luminance change of adjacent image frames in the shooting stage triggered by the user is greater than a luminance change of adjacent image frames in the preview stage after shooting is triggered, which indirectly indicates a speed at which a bottom layer of the device adjusts luminance of an image frame in the shooting state triggered by the user is greater than a speed at which the bottom layer of the device adjusts luminance of an image frame in the preview stage after shooting is triggered. That is, after shooting is triggered by the user, the device reduces a convergence speed of an algorithm for adjusting luminance of an image frame to return to, for example, a convergence speed corresponding to a preview stage before triggering shooting, to improve stability and smoothness of the device displaying a preview image.

In an optional embodiment of the first aspect of this application, the displaying an eighth image frame and a ninth image frame includes:

obtaining, by the image control module of the electronic device, a tenth image frame from the image sensor of the electronic device, where the tenth image frame is an image frame before the eighth image frame and the ninth image frame;

when the image control module determines that an image parameter of the tenth image frame does not converge to the first target parameter interval, executing, by the image control module, the image control algorithm at a third convergence speed to obtain a third image control parameter, where the third convergence speed is less than the second convergence speed;

collecting, by the image sensor, the eighth image frame and the ninth image frame based on the third image control parameter; and displaying, by the electronic device, the eighth image frame and the ninth image frame.

In the solution above, the electronic device displays the eighth image frame and the ninth image frame on the shooting preview interface, the eighth image frame and the ninth image frame may be collected based on a third image control parameter determined based on a tenth image frame before the eighth image frame and the ninth image frame. The image control module of the electronic device adjusts image parameters of the eighth image frame and the ninth image frame after the tenth image frame by analyzing the image parameters of the tenth image frame, for example, image luminance, sharpness, and white balance of the tenth image frame, so that the image parameters of the eighth image frame and the ninth image frame can converge to the image parameter interval corresponding to a current shooting environment as soon as possible. It should be noted that, in this embodiment, after shooting is triggered by the user, the image control module reduces the convergence speed for executing the image control algorithm, for example, executing the image control algorithm at a default convergence speed. This can improve stability and smoothness of the device displaying the preview image.

In an optional embodiment of the first aspect of this application, the obtaining a shot fifth image frame includes:

obtaining, by the image control module of the electronic device, the fifth image frame from the image sensor of the electronic device, where the fifth image frame is an image frame after the third image frame and the fourth image frame;

when the image control module determines that an image parameter of the fifth image frame converges to a second target parameter interval, reporting, by the image control module, an image parameter convergence status of the fifth image frame to a shooting control module of the electronic device, where the second target parameter interval includes the first target parameter interval; and controlling, by the shooting control module, to store the fifth image frame to a target space based on the image parameter convergence status of the fifth image frame.

In the above solution, the shooting control module controls to store the fifth image frame based on a status reported by the image control module that the image parameter of the fifth image frame converges. It should be noted that, the image control module determines the convergence status of the image parameter of the fifth image frame based on the newly configured second target parameter interval, and the second target parameter interval is a wider target parameter interval compared with the first target parameter interval. Such configuration can avoid the shooting delay as far as possible. Refer to FIG. 9. For example, the image parameter is image luminance, and the image luminance of the fifth image frame is within an interval (L-thd1, L-thd2). When the image luminance convergence status is determined based on the first target luminance interval, if the image luminance of the fifth image frame does not converge, the shooting control module delays shooting, that is, a captured image frame is an image frame after the fifth image frame. When the image luminance convergence status is determined based on the second target luminance interval, if the image luminance of the fifth image frame converges, the shooting control module stores the fifth image frame in an album as a captured image frame.

According to a second aspect, an embodiment of this application provides an electronic device. The electronic device includes: a detection module, a display module and an obtaining module;

at a first moment, the detection module detects a first operation of pressing a shooting button by a user, and before the first moment, the display module displays a first image frame and a second image frame, where the first image frame and the second image frame are adjacent image frames;

at a second moment, the detection module detects a second operation of lifting the shooting button by the user, and between the first moment and the second moment, the display module displays a third image frame and a fourth image frame, where the third image frame and the fourth image frame are adjacent image frames; and at the third moment, the obtaining module obtains a shot fifth image frame, where the second moment is later than the first moment, and the third moment is later than the second moment; and a luminance change speed of the third image frame and the fourth image frame is greater than a luminance change speed of the first image frame and the second image frame.

According to a third aspect, an embodiment of this application provides an electronic device. The electronic device includes a memory and a processor, and the processor is configured to invoke computer program in the memory to perform the method according to any one of the first aspect or the implementations of the first aspect.

According to a fourth aspect, an embodiment of this application provides a computer-readable storage medium. The computer-readable storage medium stores computer instructions, and when the computer instructions are run on an electronic device, the electronic device is enabled to perform the method according to any one of the first aspect and the implementations of the first aspect.

According to a fifth aspect, an embodiment of this application provides a chip. The chip includes a processor, and the processor is configured to invoke computer program in a memory to perform the method according to any one of the first aspect or the implementations of the first aspect.

According to a sixth aspect, a computer program product includes a computer program, and when the computer program is run, a computer is enabled to perform the method according to any one of the first aspect or the implementations of the first aspect.

It should be understood that technical solutions of the second aspect to the sixth aspect of this application are corresponding to the technical solutions of the first aspect of this application, and beneficial effects achieved in the aspects and corresponding feasible implementations are similar. Details are not described.

DESCRIPTION OF EMBODIMENTS

Figure 1:
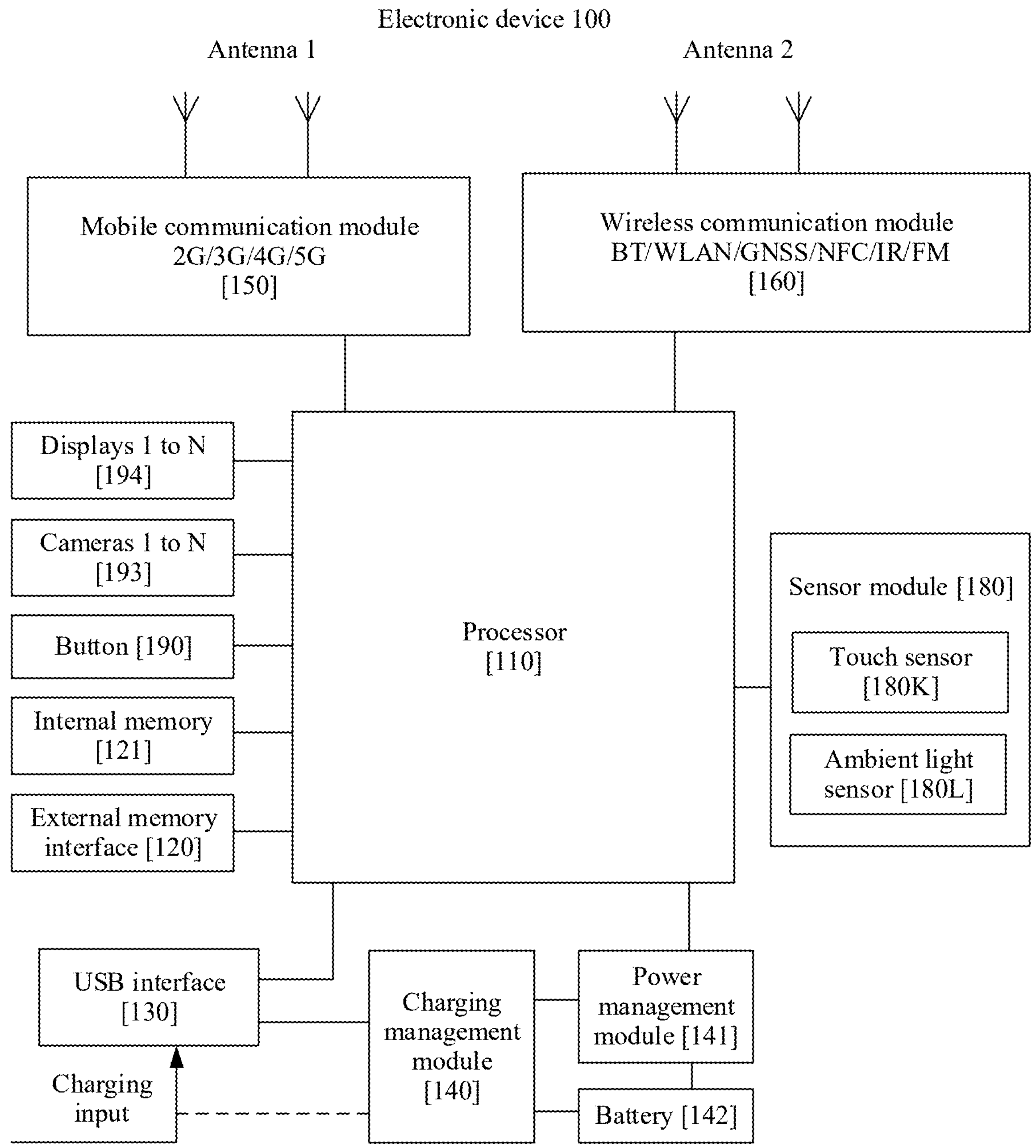
FIG. 1 is a schematic diagram of an interface change of a mobile phone according to an embodiment of this application.

To clearly describe technical solutions in embodiments of this application, terms such as "first" and "second" are used in embodiments of this application to distinguish between same items or similar items that provide basically same functions or purposes. For example, the first image control parameter and the second image control parameter are only to distinguish image control parameters of a camera at different times, and do not limit a sequence of the image control parameters. A person skilled in the art may understand that the words such as "first" and "second" do not limit a quantity or an execution sequence, and the words such as "first" and "second" do not indicate a definite difference.

It should be noted that in embodiments of this application, words such as "example" or "for example" are used to represent giving an example, an illustration, or a description. Any embodiment or design scheme described as an "example" or "for example" in this application should not be construed as being more preferred or more advantageous than another embodiment or design scheme. To be precise, the terms such as "example" or "for example" are intended to present a related concept in a specific manner.

In embodiments of this application, "at least one" means one or more, and "a plurality of" means two or more. The term "and/or" describes an association relationship between associated objects, and indicates that three relationships may exist. For example, A and/or B may indicate the following three cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

First of all, technical terms involved in embodiments of this application are briefly introduced.

RAW: an image format. A RAW image is raw data obtained when a complementary metal oxide semiconductor (CMOS) or a charge coupled device (CCD) image sensor converts a captured light source signal into a digital signal.

YUV: an image format. "Y" represents luminance (luminance or luma), for example, a gray scale value; and "U" and "V" represent chrominance (chrominance or chroma), which are used for describing a color and saturation of an image and designating a color of a pixel.

3A: includes automatic exposure (AE), auto focus (AF), and auto white balance (AWB).

The technical solutions provided in this application can be applied to any electronic device having shooting and display functions. The electronic device may be a smartphone, a tablet computer, a notebook computer, a palmtop computer, a personal digital assistant (PDA), a portable media player (PMP), a navigation apparatus, a wearable device, and the like. The embodiments of this application do not particularly limit a specific form of the electronic device.

In a possible shooting scenario, a user uses a mobile phone to capture a person or an object in a moving state. For example, FIG. 1 is a schematic diagram of an interface change of a mobile phone according to an embodiment of this application. As shown in FIG. 1, a user clicks a camera application icon on a mobile phone interface 101 to start a camera. After the camera is turned on, a shooting preview image is displayed on the mobile phone interface 102. During shooting preview, the user may click a shooting control 103 on the mobile phone interface 102 to trigger the camera to shoot, to capture preview image content when the user clicks to shoot. The preview image content obtained when the user clicks shooting usually means preview image content obtained when the user's finger leaves the shooting control 103. The user may view the captured image content by invoking an album interface 104. Due to a shutter lag of the camera, image content recorded in the album (such as the image content shown in the interface 104) is inconsistent with preview image content of an interface (such as the image content shown in the interface 102) when shooting is triggered by the user.

Figure 2:
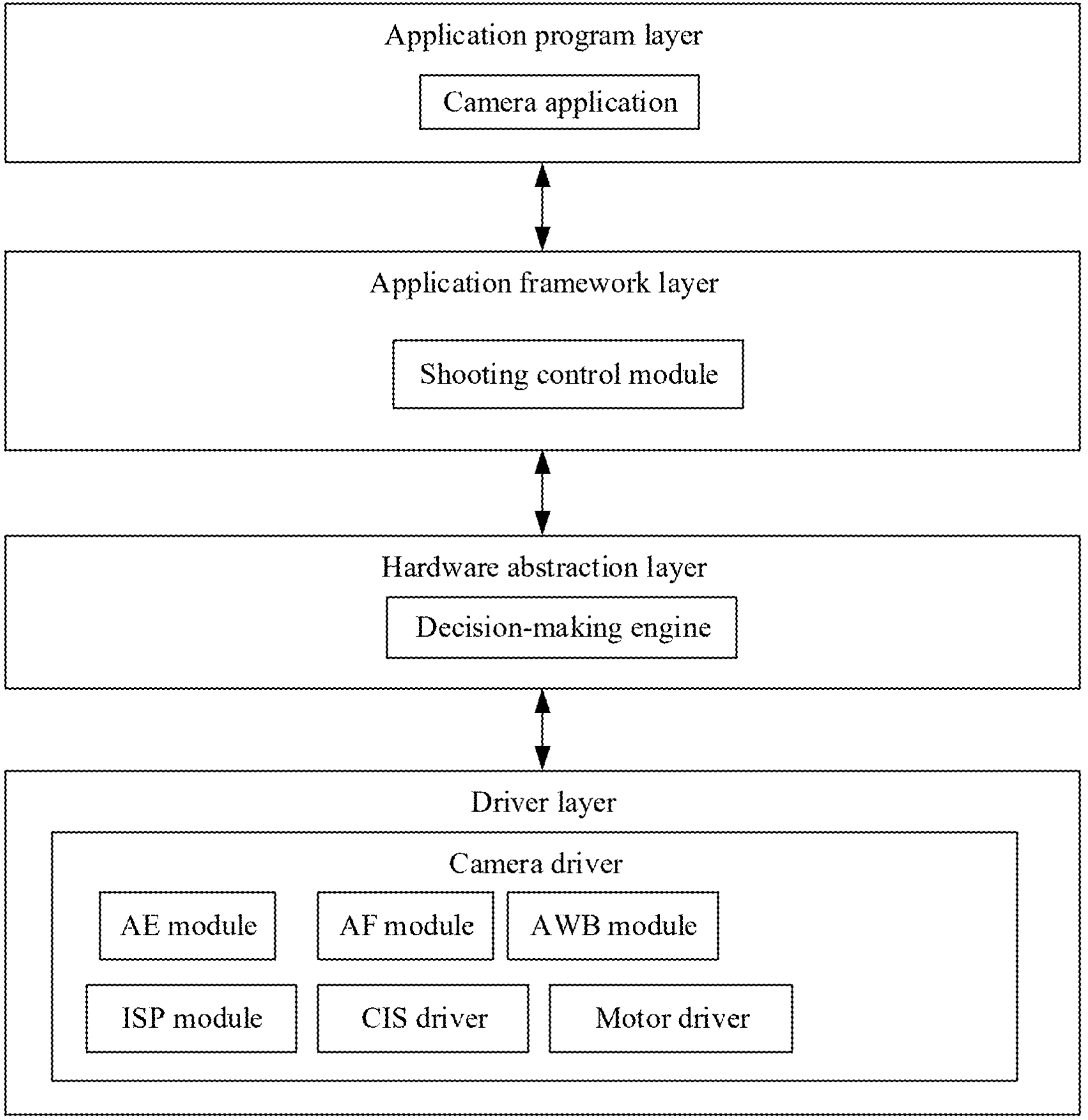
FIG. 2 is a schematic diagram of shooting a preview image frame according to an embodiment of this application.

For example, FIG. 2 is a schematic diagram of shooting a preview image frame according to an embodiment of this application. With reference to the user operation shown in FIG. 1, when a user uses a mobile phone to capture a person in a moving state, image content of a shooting preview interface includes a plurality of continuous image frames, such as an image frame 1 to an image frame 3 in FIG. 2. When the user clicks a shooting control, the shooting preview interface displays the image frame 1. If a shutter lag of the camera is long, an actual shooting result may be a specific image frame after the image frame 1, such as the image frame 3. Usually, there may be a large difference between motions and expressions of a person in the image frame 3 and the image frame 1. As a result, the user cannot capture desired image content of the person at a specific moment.

Causes of the camera shutter lag are manifold, with one main cause being that automatic exposure (AE) does not converge. In combination with the described scenario, when the user captures a person in a moving state, and when the user presses a shooting control, the AE may be in a convergence status. According to an Android standard, shooting can be actually triggered only after waiting for the convergence of the AE. That is, when the AE does not converge, the camera application blocks the shooting until the AE reports convergence or wait timeout and then the camera application can actually trigger shooting. As a result, a user cannot shoot an image content at a desired moment, and the user has poor experience in shooting.

In view of the above problems, an embodiment of this application provides a shooting method, which can be applied to a device such as a single lens reflex camera, a mirrorless camera, or a smartphone having shooting and display functions. A main idea is as follows: When a user presses a shooting button (or a shooting control), an image control algorithm (for example, an AE algorithm for adjusting image luminance) is adjusted. A convergence speed of image luminance is adjusted to accelerate convergence of the image control algorithm (for example, convergence of the AE), so that when the user lifts the shooting button, an image parameter (for example, image luminance) can achieve a better convergence level, that is, the image parameter converges to a target interval (for example, the image luminance converges to a target luminance interval). When a user lifts a shooting button, it is determined whether an image parameter converges to a newly configured target interval, and if the image parameter converges to the newly configured target interval, a device is immediately triggered to shoot.

When the method is applied, a camera can accurately capture a preview image picture at a moment at which a user lifts a shooting button. A convergence speed of an image control algorithm is improved in the process, for example, a convergence speed of an AE algorithm is improved, so that an exposure condition of a collected image frame is good, a problem that an image frame is overexposed or too dim is avoided, and shooting experience of lifting the shooting button by the user is improved.

To help better understand embodiments of this application, the following describes a structure of an electronic device in embodiments of this application. For example, FIG. 3A to FIG. 3C are a schematic diagram of a structure of an electronic device according to an embodiment of this application.

Figure 3A:
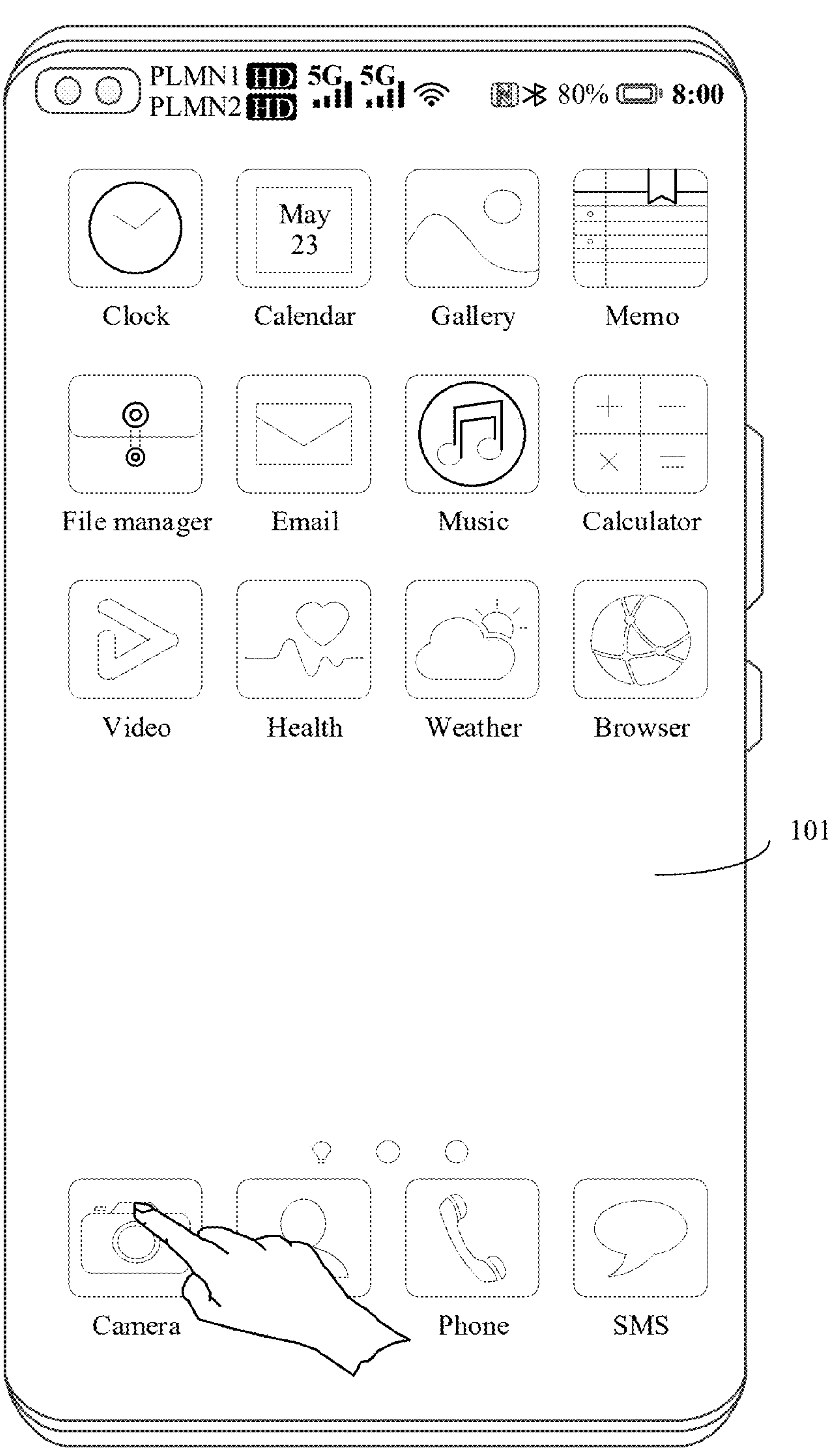
FIG. 3A to FIG. 3C are a schematic diagram of a structure of an electronic device according to an embodiment of this application.
Figure 3B:
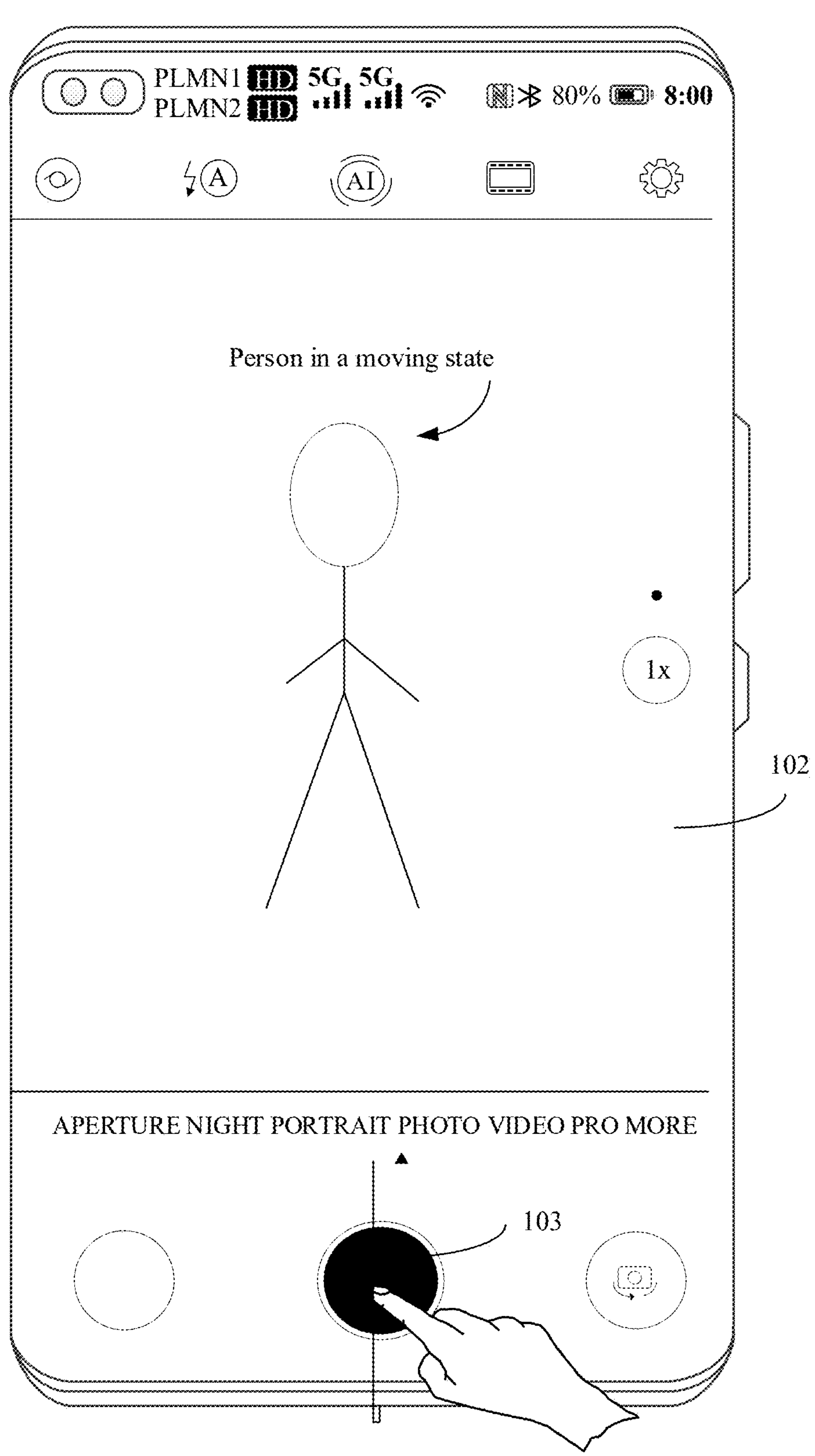
Figure 3C:
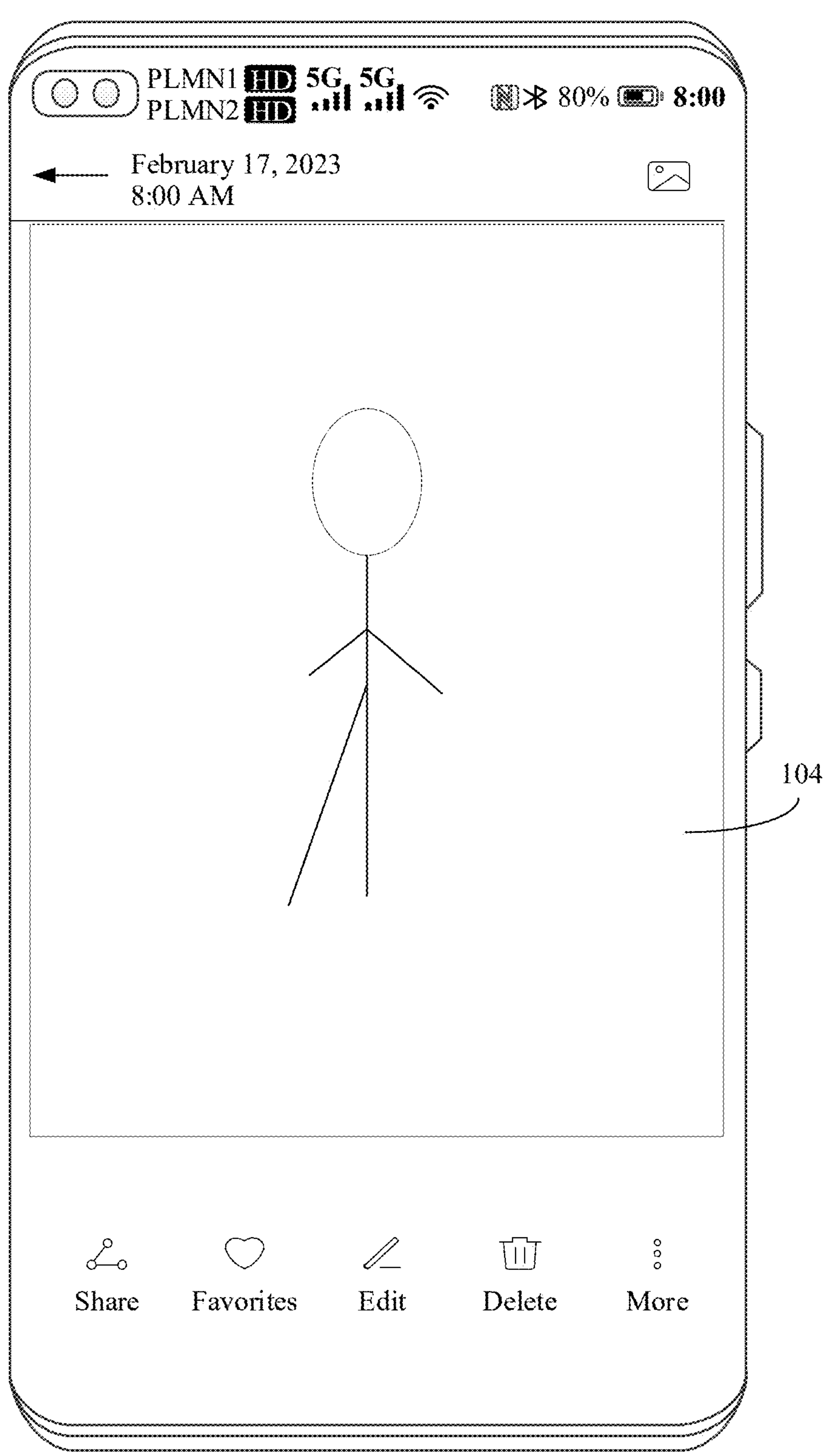

The electronic device 100 shown in FIG. 3A to FIG. 3C may include a processor 110, an external memory interface 120, an internal memory 121, a universal serial bus (USB)

interface 130, a charging management module 140, a power management module 141, a battery 142, an antenna 1, an antenna 2, a mobile communication module 150, a wireless communication module 160, a sensor 180, a key 190, a camera 193, a display 194, and the like.

It may be understood that a structure shown in this embodiment does not constitute a specific limitation on the electronic device 100. In some other embodiments of this application, the electronic device 100 may include more or fewer components than those shown in the figure, or some components may be combined, or some components may be split, or a different component arrangement may be used. The components shown in the figure may be implemented by hardware, software, or a combination of software and hardware.

The processor 110 may include one or more processing units. Different processing units may be separate devices, or may be integrated in one or more processors. A memory may be further disposed in the processor 110, and is configured to store instructions and data.

It may be understood that an interface connection relationship, between modules, illustrated in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The USB port 130 is an interface that conforms to a USB standard specification, and may be specifically a mini USB port, a micro USB port, a USB Type-C port, or the like.

The charging management module 140 is configured to receive a charging input from the charger. The power management module 141 is configured to connect to the battery 142, the charging management module 140, and the processor 110.

A wireless communication function of the electronic device 100 may be implemented through the antenna 1, the antenna 2, the mobile communication module 150, the wireless communication module 160, the modem processor, the baseband processor, and the like. The mobile communication module 150 may provide a wireless communication solution that includes 2G, 3G, 4G, 5G, and the like and that is applied to the electronic device 100. The wireless communication module 160 may provide wireless communication solutions, applied to the electronic device 100, that include a wireless local area network (WLAN), Bluetooth, a global navigation satellite system (GNSS), frequency modulation (FM), NFC, an infrared (IR) technology, and the like.

The electronic device 100 may implement a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute an instruction to generate or change display information.

The display 194 is configured to display an image, a video, and the like. The display 194 includes a display panel. In some embodiments, the electronic device 100 may include one or N displays 194, where N is a positive integer greater than 1.

The electronic device 100 may implement a shooting function by using an image signal processing (ISP) module, one or more cameras 193, the video codec, the GPU, one or more displays 194, the application processor, and the like.

The camera 193 is configured to capture a still image or a video. In some embodiments, the electronic device 100 may include one or N cameras 193, where N is a positive integer greater than 1. The camera 193 includes a lens, an image sensor (for example, a CMOS image sensor (complementary metal oxide semiconductor image sensor, CIS for short)), a motor, and the like.

The external memory interface 120 may be configured to connect to an external memory card, for example, a micro SD card, to extend a storage capability of the electronic device 100. The external storage card communicates with the processor 110 through the external memory interface 120, to implement a data storage function. For example, data files such as music, a photo, and a video are stored in the external memory card.

The internal memory 121 may be configured to store one or more computer programs, and the one or more computer programs include instructions. The processor 110 runs the instructions stored in the internal memory 121, to perform various function applications of the electronic device 100 and data processing.

The sensor 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor 180K, an ambient light sensor 180L, a bone conduction sensor, and the like.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194.

The ambient light sensor 180L is configured to sense ambient light luminance. The electronic device 100 may adaptively adjust luminance of the display 194 based on the sensed ambient light luminance. The ambient light sensor 180L may also be configured to automatically adjust white balance during shooting. The ambient light sensor 180L may further cooperate with the optical proximity sensor in detecting whether the electronic device 100 is in a pocket, to prevent an accidental touch.

The button 190 includes a power button, a volume button, and the like. The button 190 may be a mechanical button, or may be a touch button. The electronic device 100 may receive a button input, and generate a button signal input related to a user setting and function control of the electronic device 100.

A software system of the electronic device may use a layered architecture, an event-driven architecture, a microkernel architecture, a microservice architecture, or a cloud architecture. For example, FIG. 4 is a schematic diagram of an architecture of software of an electronic device according to an embodiment of this application.

Figure 4:
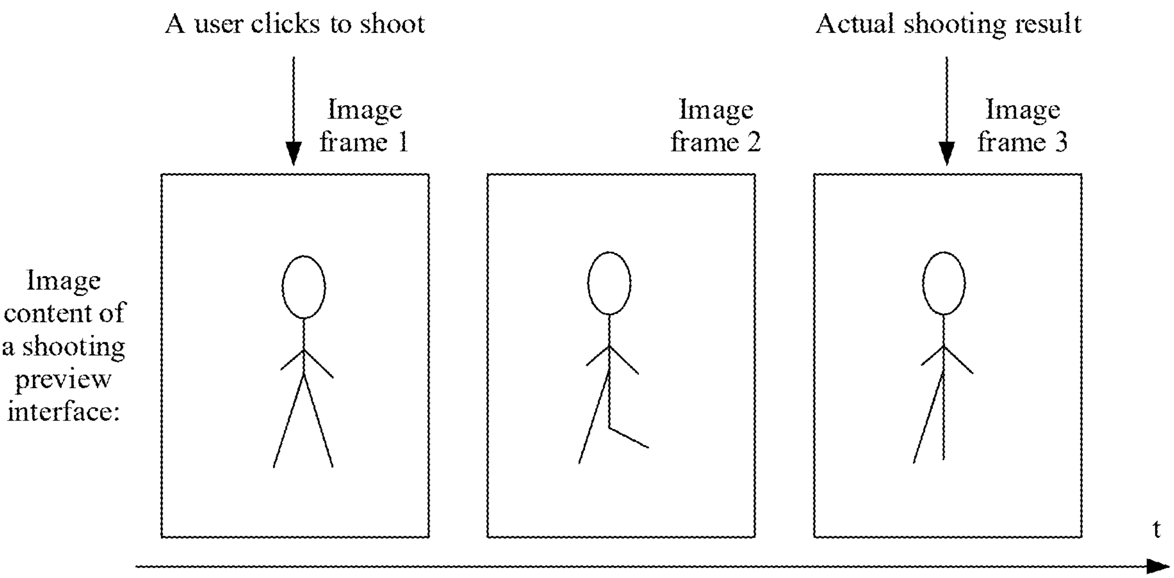
FIG. 4 is a schematic diagram of a software architecture of an electronic device according to an embodiment of this application.

As shown in FIG. 4, in a hierarchical architecture of an electronic device, software may be divided into several layers, and each layer has a clear role and task. The layers communicate with each other through a software interface. In some embodiments, an Android software architecture is divided into layers, which are respectively an application program layer 401, an application framework layer 402, a hardware abstraction layer 403 and a drive layer 404 from top to bottom.

The application program layer 401 includes a camera application, the application framework layer 402 includes a shooting control module, the hardware abstraction layer 403 includes a decision-making engine, the driver layer 404 includes a camera driver, and the camera driver may include, for example, an ISP module, an AE module, an AF module, an AWB module, a CIS driver, and a motor driver.

The shooting control module is configured to determine whether to trigger a camera to shoot, based on an AE convergence status reported by the AE module, an AF convergence status reported by the AF module, and an AWB convergence status reported by the AWB module. The AE convergence status includes that AE converges, the AF convergence status includes that AF convergence, and the AWB convergence status includes that AWB convergence. As an example, the shooting control module may trigger the camera to shoot when AE converges. It should be noted that, if the AE does not converge after the shooting control module waits for preset duration, the camera may also be triggered to shoot.

The decision-making engine may be configured to, after receiving a user trigger event delivered by the camera application, send the trigger event to the driver layer 404, and may trigger the AE module, the AF module, and the AWB module at the driver layer 404 to execute corresponding algorithms and adjust image control parameters. The decision-making engine may also be used to report camera capability related data, such as a quantity of cameras and camera shooting parameters, to the application framework layer 402. In some embodiments, the decision-making engine may be further configured to determine whether a user operation is a false touch, and if the user operation is a false touch, the decision-making engine does not deliver a notification of a trigger event to the driver layer 404, to avoid a false shooting of the camera.

The ISP module is configured to convert RAW image data output by a CIS into YUV image data, and send the YUV image data to a screen for display. The ISP module is further configured to output AE statistics data of a RAW image to the AE module, output AF statistics data of the RAW image to the AF module, and output AWB statistics data of the RAW image to the AWB module.

The AE module is configured to determine, based on AE statistical data of a RAW image, whether to execute an AE algorithm, to adjust luminance of a subsequent output image of the CIS. The AF module is configured to determine, based on the AF statistical data of the RAW image, whether to execute an AF algorithm, to adjust a lens position of the camera, for example, adjust a lens focal length of the camera. The AWB module is configured to determine, based on the AWB statistics data of the RAW image, whether to execute an AWB algorithm, so as to adjust white balance of an image subsequently output by the ISP module.

In embodiments of this application, an AE algorithm, an AF algorithm, and an AWB algorithm are not limited, and reference may be made to an existing AE algorithm, AF algorithm, and AWB algorithm.

The CIS driver is configured to drive the CIS to adjust luminance, white balance, and the like of an output image.

The motor driver is configured to drive movement of a lens motor in the camera, to adjust a position of a lens and achieve focusing.

A shooting method provided in this application is described below in detail with reference to specific embodiments. It should be noted that the technical solutions provided in this application may include some or all of the following content. The following several specific embodiments may be combined with each other, and same or similar concepts or processes may not be described repeatedly in some embodiments.

Figure 5:
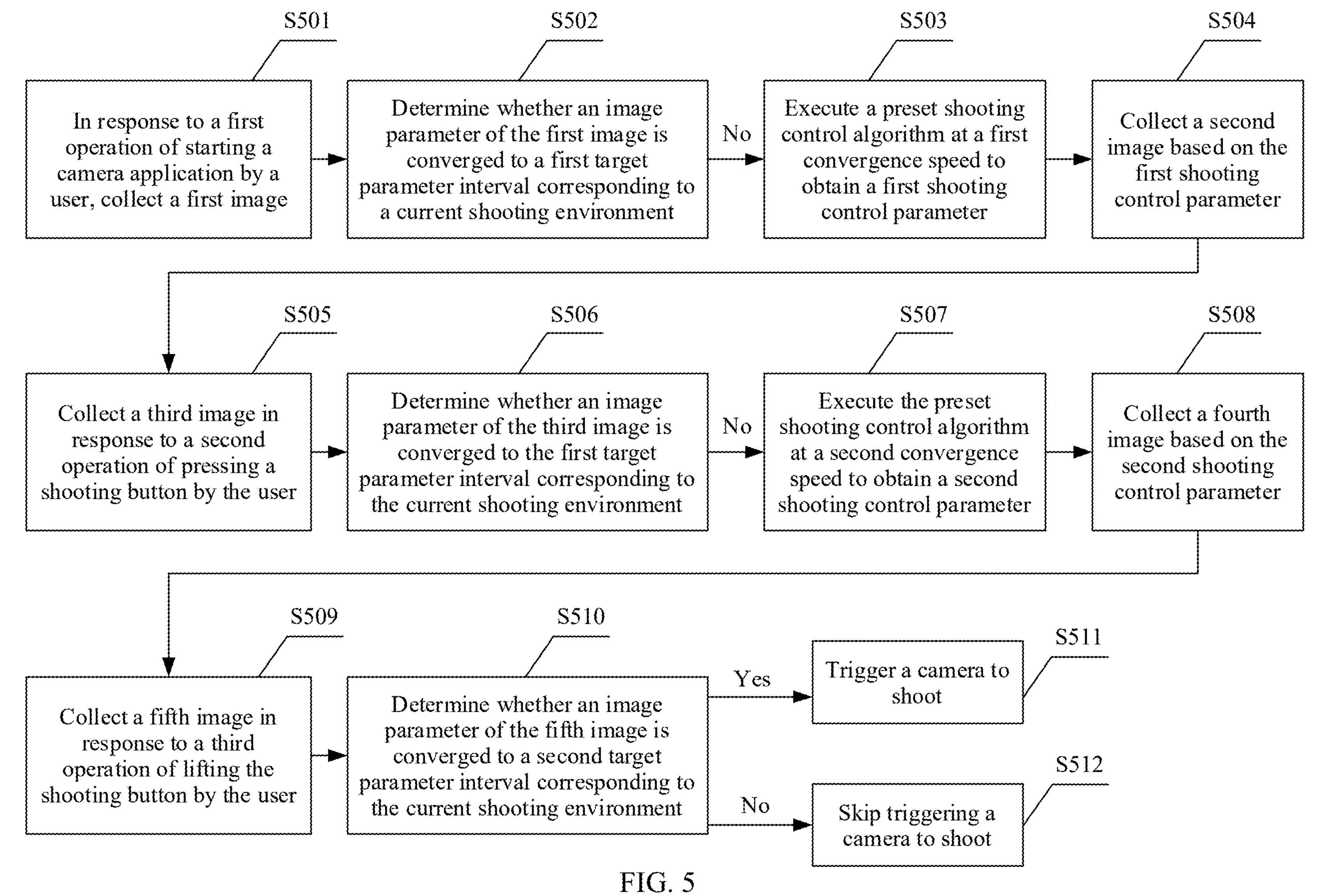
FIG. 5 is a schematic flowchart of a shooting method according to an embodiment of this application.

For example, FIG. 5 is a schematic flowchart of a shooting method according to an embodiment of this application. For ease of description, the following embodiments are described by using a mobile phone as an execution entity.

As shown in FIG. 5, the shooting method in an embodiment includes the following steps.

S501: Collect a first image in response to a first operation of starting a camera application by a user.

In response to the first operation of starting the camera application by the user, an image sensor collects a first image. The first image is an image in a RAW format.

S502: Determine whether an image parameter of the first image converges to a first target parameter interval corresponding to a current shooting environment.

If it is determined that the image parameter of the first image does not converge to the first target parameter interval corresponding to the current shooting environment, S503 is executed. If it is determined that the image parameter of the first image converges to the first target parameter interval corresponding to the current shooting environment, the current image control parameter is kept. The image control parameters include, for example, an exposure time, a gain, aperture, a focal length value, an AWB value, and the like.

In this embodiment, the image parameter of the first image includes a luminance value of the first image. The determining whether an image parameter of the first image converges to a first target parameter interval corresponding to a current shooting environment includes: determining, by an AE module, whether the luminance value of the first image converges to a first target luminance interval corresponding to the current shooting environment.

Alternatively, in some embodiments, the image parameter of the first image further includes sharpness of the first image. The determining whether an image parameter of the first image converges to a first target parameter interval corresponding to a current shooting environment includes: determining, by an AF module, whether the sharpness of the first image converges to a first target sharpness interval corresponding to the current shooting environment.

Alternatively, in some embodiments, the image parameter of the first image further includes white balance of the first image. The determining whether an image parameter of the first image converges to a first target parameter interval corresponding to a current shooting environment includes: determining, by an AWB module, whether the white balance of the first image converges to a first target white balance interval corresponding to the current shooting environment.

S503: Execute a preset image control algorithm at a first convergence speed to obtain a first image control parameter.

In this embodiment, the preset image control algorithm includes an AE algorithm. The AE algorithm is used to adjust image luminance, so that the image luminance approaches the first target luminance interval corresponding to a current shooting environment. The executing a preset image control algorithm includes: executing, by an AE module, a preset AE algorithm at the first convergence speed, to obtain a first parameter, where the first parameter includes an exposure time and a gain. Alternatively, the first parameter may further include an aperture value. The image sensor may collect a subsequent image based on the first parameter. It should be noted that a lens in a camera of the mobile phone usually has a fixed aperture, and therefore the first control parameter is mainly the exposure time and the gain.

Alternatively, in some embodiments, the image control algorithm further includes: an AF algorithm. The AF algorithm is used to adjust image sharpness, so that the image sharpness approaches a target sharpness interval corresponding to the current shooting environment. The executing a preset image control algorithm includes: executing, by an AF module, a preset AF algorithm at the first convergence speed, to obtain a second parameter, where the second parameter includes a focal length value. The AF module sends the second parameter to the lens motor, to adjust sharpness of a subsequent image.

Alternatively, in some embodiments, the image control algorithm further includes an AWB algorithm. The AWB algorithm is used to adjust image white balance, so that the image white balance approaches a target white balance interval corresponding to the current shooting environment. The executing a preset image control algorithm includes: executing, by the AWB module, a preset AWB algorithm at the first convergence speed, to obtain a third parameter, where the third parameter includes an AWB value. The AWB module sends the third parameter to the ISP module to adjust a white balance of a subsequent image.

Figure 6:
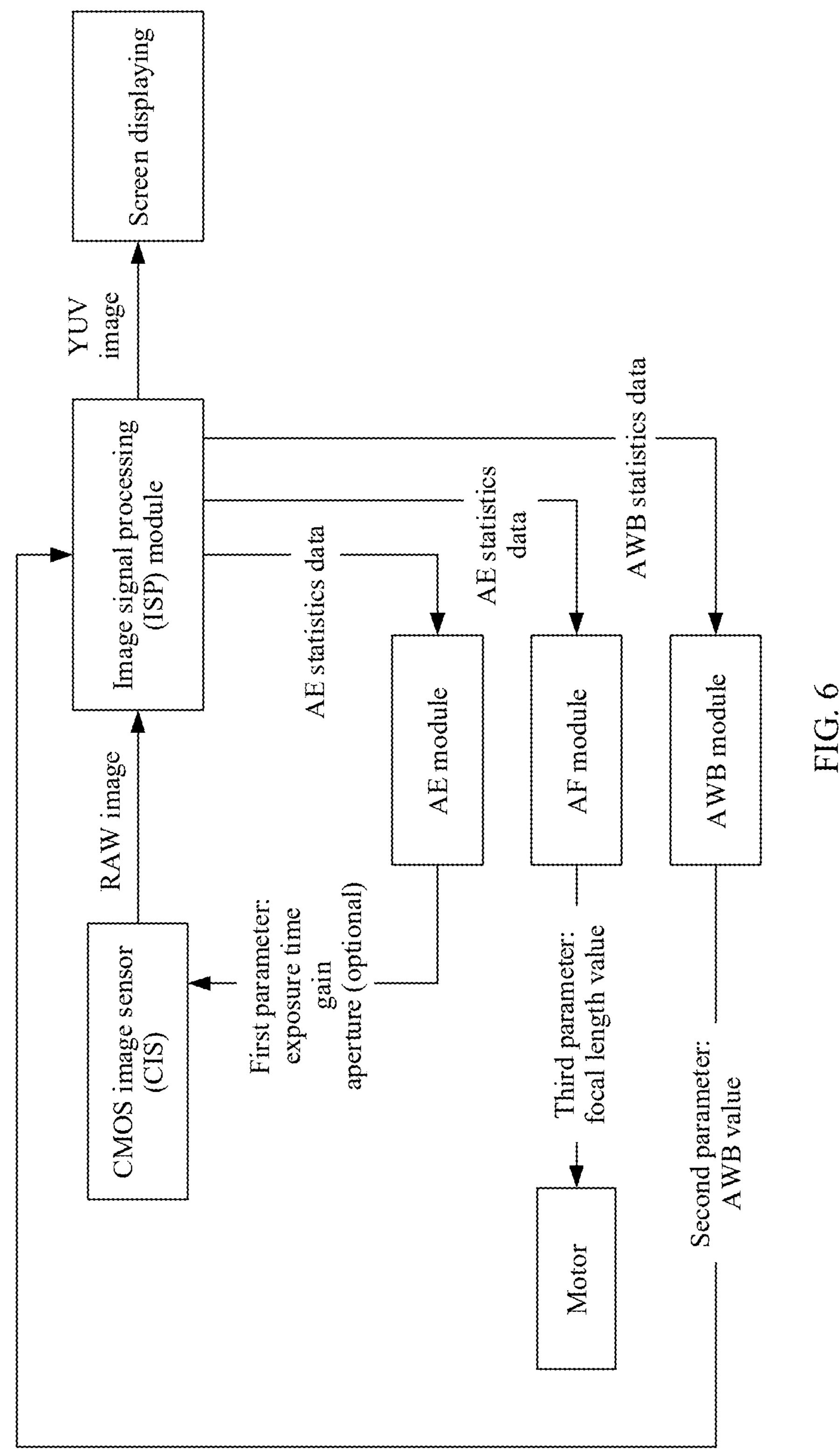
FIG. 6 is a schematic flowchart of lower layer processing of a mobile phone according to an embodiment of this application.

For example, FIG. 6 is a schematic flowchart of lower layer processing of a mobile phone according to an embodiment of this application. As shown in FIG. 6, after the user starts the camera application, after the CIS of the camera collects a RAW image, the RAW image is sent to the ISP module. On the one hand, the ISP module converts the RAW image into a YUV image, and sends the YUV image to the screen for display. In another aspect, the ISP module determines 3A statistics data of the RAW image, the 3A statistics data includes AE statistics data, AF statistics data, and AWB statistics data of the RAW image. The ISP module sends the AE statistical data of the RAW image to the AE module, the AF statistical data of the RAW image to the AF module, and the AWB statistical data of the RAW image to the AWB module.

The AE statistics data may be used by the AE module to determine an AE convergence status, and the AE convergence status includes that AE does not converge, or AE converges. That AE converges means that a luminance value of the RAW image is in a first target luminance interval corresponding to the current shooting environment. That AE does not converge means that a luminance value of the RAW image does not fall within the first target luminance interval. If the AE module determines that the AE does not converge, the AE module executes a preset AE algorithm at the first convergence speed, and sends the first parameter to the CIS, so that luminance of a RAW image subsequently collected by the CIS approaches target luminance.

The AF statistics data may be used by the AF module to determine an AF convergence status, and the AF convergence status includes that AF does not converge, or AF converges. That AF converges means that sharpness of the RAW image is in a first target sharpness interval corresponding to the current shooting environment. That AF does not converge means that sharpness of the RAW image does not fall within the first target sharpness interval. If the AF module determines that the AF does not converge, the AF module executes a preset AF algorithm at the first convergence speed, and sends a second parameter to a motor of a lens, and the second parameter includes a focal length value, so that the motor pushes the lens to move to adjust a position of the lens, and sharpness of the RAW image subsequently collected by the CIS tends to approach target sharpness.

The AWB statistics data may be used by the AWB module to determine an AWB convergence status, and the AWB convergence status includes that AWB does not converge, or AWB converges. That AWB converges means that white balance of the RAW image is in a first target white balance interval corresponding to the current shooting environment. That AWB does not converge means that white balance of the RAW image does not fall within the first target white balance interval. If the AWB module determines that AWB does not converge, the AWB module executes a preset AWB algorithm at the first convergence speed, and sends a third parameter to the ISP module, and the third parameter includes an AWB value, so that white balance of an image output by the ISP module approaches target white balance.

It should be noted that, after the user starts the camera application, the foregoing steps is performed, an image control parameter is dynamically adjusted, so that quality of an image displayed on a mobile phone interface meets a quality requirement for an image in the current shooting environment.

S504: Collect a second image based on the first image control parameter.

Based on the foregoing steps, the first image control parameter includes at least one of the first parameter, the second parameter, and the third parameter. The second image is an image in the RAW format, and the second image is an image after the first image. It should be noted that at least one frame of image is usually included between the second image and the first image.

As an example, the CIS receives the first parameter of the AE module, and collects the second image based on the first parameter.

As an example, the lens motor receives the second parameter of the AF module to adjust the lens focal length and to collect the second image.

As an example, the ISP module receives the third parameter of the AWB module, and adjusts white balance of the second image based on the third parameter.

S505: Collect a third image in response to a second operation of pressing a shooting button by the user.

In response to the second operation of pressing the shooting button by the user, the image sensor collects the third image. The third image is an image in the RAW format.

S506: Determine whether an image parameter of the third image converges to the first target parameter interval corresponding to the current shooting environment.

If it is determined that the image parameter of the third image does not converge to the first target parameter interval corresponding to the current shooting environment, S507 is executed. If it is determined that the image parameter of the third image converges to the first target parameter interval corresponding to the current shooting environment, the current image control parameter is kept.

For S506 in this embodiment, refer to S502. Details are not described herein again. It should be noted that first target parameter intervals corresponding to different shooting environments are different, that is, different shooting environments have different parameter requirements for an image.

S507: Execute the preset image control algorithm at a second convergence speed to obtain a second image control parameter.

In this embodiment, the second convergence speed is greater than the first convergence speed. Optionally, the second convergence speed may be N times the first convergence speed, where N is greater than 1, for example, N is 3. The second image control parameter includes at least one of the first parameter, the second parameter, and the third parameter.

In this embodiment, the preset image control algorithm includes an AE algorithm. The executing the preset image control algorithm at a second convergence speed includes: executing, by an AE module through invoking a first interface, the preset AE algorithm at the second convergence speed, to obtain the first parameter. The first interface is configured with the second convergence speed for accelerating the AE convergence.

Optionally, in some embodiments, the image control algorithm includes the AF algorithm. The executing the preset image control algorithm at a second convergence speed includes: executing, by the AF module through invoking a second interface, the preset AF algorithm at the second convergence speed, to obtain the second parameter. The second interface is configured with the second convergence speed for accelerating AF convergence.

Alternatively, in some embodiments, the image control algorithm further includes the AWB algorithm. The executing the preset image control algorithm at a second convergence speed includes: executing, by the AWB module through invoking a third interface, the preset AWB algorithm at the second convergence speed, to obtain the third parameter. The third interface is configured with the second convergence speed to accelerate AWB convergence.

S508: Collect a fourth image based on the second image control parameter.

The fourth image is an image in the RAW format, and the fourth image is an image after the third image. It should be noted that at least one frame of image is usually included between the fourth image and the third image.

S509: Collect a fifth image in response to a third operation of lifting the shooting button by the user.

In response to the third operation of lifting the shooting button by the user, the image sensor collects the fifth image. The fifth image is an image in the RAW format.

S510: Determine whether an image parameter of the fifth image converges to the second target parameter interval corresponding to the current shooting environment.

If it is determined that the image parameter of the fifth image converges to the second target parameter interval corresponding to the current shooting environment, S511 is executed. If it is determined that the image parameter of the fifth image does not converge to the second target parameter interval corresponding to the current shooting environment, S512 is executed.

The second target parameter interval includes the first target parameter interval.

In an example, the first target parameter interval is a first luminance interval, the second target parameter interval is a second luminance interval, and the second luminance interval includes the first luminance interval.

In an example, the first target parameter interval is a first sharpness interval, the second target parameter interval is a second sharpness interval, and the second sharpness interval includes the first sharpness interval.

It should be noted that, the first target parameter interval shown in S502 and S506 is used to determine whether an image control parameter needs to be adjusted (for example, an exposure time, a gain, a focal length value, an AWB value), and the second target parameter interval shown in S510 is used to determine a convergence status of the image parameter (for example, an AE convergence status, an AF convergence status, and an AWB convergence status).

S511: Trigger the camera to shoot.

The camera is triggered to shoot, so that a preview image displayed on an interface of the mobile phone when the user lifts the shooting button, that is, the fifth image, can be stored in an album of the mobile phone.

S512: Skip triggering the camera to shoot.

It should be noted that the first image to the fifth image are all displayed on the screen after image processing.

The above embodiment shows a shooting method. After a user starts a camera application, an image control algorithm is executed based on a first convergence speed, and an image control parameter is obtained, to adjust parameters, such as luminance and sharpness, of an image. After the user presses a shooting button, the convergence speed of the image control algorithm is increased, for example, the image control algorithm is executed at a second convergence speed, to accelerate convergence of the image parameters, so that the parameters such as luminance and sharpness of the image can converge to around a first target parameter interval before the user lifts the shooting button. In this way, when the user lifts the shooting button, the image parameter converges to around the first target parameter interval (for example, converges to a second target parameter interval), the second target parameter interval includes the first target parameter interval, and then a camera can be directly triggered shoot to avoid delaying the shooting. This improves capturing performance of a device, so that the user can capture a preview image displayed on a device interface at a desired moment and improves shooting experience of the user.

Based on the above embodiments, the above shooting method is described in detail with reference to FIG. 7.

Figure 7:
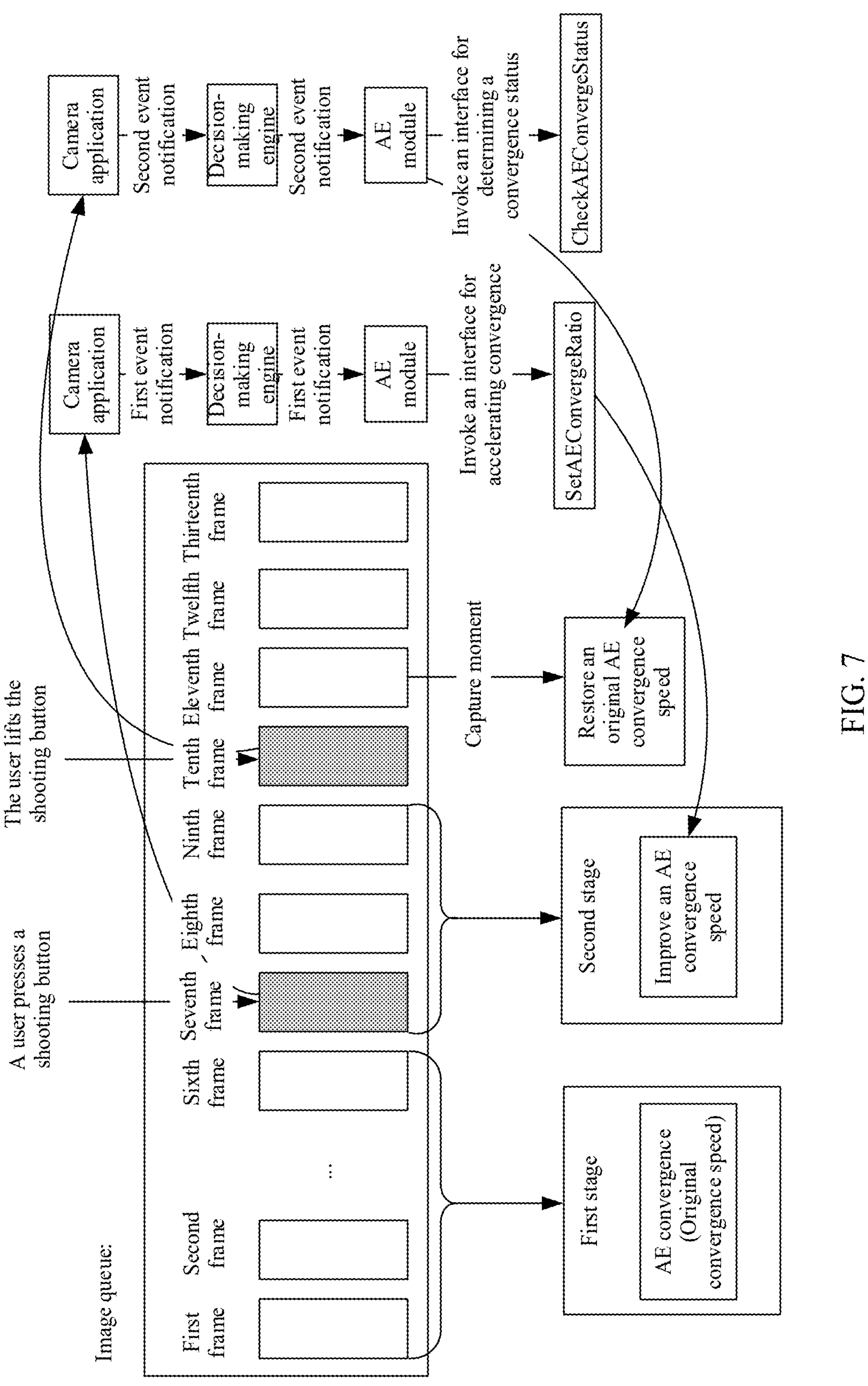
FIG. 7 is a schematic flowchart of shooting control in different user operation stages according to an embodiment of this application.

For example, FIG. 7 is a schematic flowchart of shooting control in different user operation stages according to an embodiment of this application. After the user starts the camera application, the CIS of the camera starts to collect image data, the image data is stored in an image queue, and after the image data in the image queue is processed by the ISP module and the 3A modules, the image data can be sent, by the ISP module, to the screen for displaying.

For ease of description, the solution is described below by taking the AE module as an example.

As shown in FIG. 7, the image queue includes 11 frames of image. A first to a sixth frame are image frames collected by the image sensor before the user presses the shooting button, and a stage corresponding to the first frame to the sixth frame is a first stage (namely, a preview stage). A seventh frame is an image frame collected by the image sensor when the user presses the shooting button; a tenth frame is an image frame collected by the image sensor when the user lifts the shooting button; and a stage corresponding to the seventh frame to a ninth frame is a second stage; and a moment corresponding to the tenth frame is a capture moment (namely, a shooting moment).

It should be noted that, in this example, the quantity of image frames in the second stage is only an example. The quantity of image frames in the second stage is related to duration of pressing and lifting the finger by the user, and longer duration indicates more image frames in the second stage.

Usually, there is about 100 ms between a time when the user presses the shooting button and a time when the user lifts the shooting button. This time period corresponds to the second stage, and the second stage may be used for 3A convergence of the camera.

As shown in FIG. 7, in response to an operation of pressing the shooting button by the user, the camera application at an application program layer sends a first event notification to a decision-making engine at a hardware abstraction layer, and the first event notification is used for notifying the user of an event of pressing the shooting button. The decision-making engine sends the first event notification to the AE module at the driver layer, and before executing the AE algorithm, the AE module can increase the convergence speed of the AE algorithm by invoking an accelerated convergence interface (SetAEConvergeRatio), for example, adjusting from the first convergence speed to the second convergence speed. The second convergence speed is greater than the first convergence speed, that is, an AE convergence speed corresponding to the second stage is greater than an AE convergence speed of the preview state.

After the AE module increases the convergence speed to the second convergence speed, the AE module executes the AE algorithm at the second convergence speed; and the AE module outputs new image control parameters, such as an exposure time and a gain, for the CIS to collect an image after the seventh frame of image, such as an eighth frame of image.

It should be noted that, in an actual application, a new image control parameter output by the AE module is used for the CIS to collect a $(7+N)^{th}$ frame image, where N is a positive integer greater than 1. A reason is that the CIS continuously collects image frames, and before the AE module outputs the new image control parameter, the CIS still collects, for example, the eighth frame image based on an original image control parameter, and after the new image control parameter is determined, the CIS collects, for example, the ninth frame image based on the new image control parameter.

As shown in FIG. 7, in response to the operation of lifting the shooting button by the user, the camera application sends a second event notification to the decision-making engine, and the second event notification is used to notify the user to lift the shooting button. The decision-making engine sends the second event notification to the AE module, and before executing the AE algorithm, the AE module reduces the convergence speed of the AE algorithm, for example, adjusts the second convergence speed to a third convergence speed. The third convergence speed is less than the second convergence speed, that is, an AE convergence speed corresponding to a capture moment is less than the AE convergence speed corresponding to the second stage. Optionally, the first convergence speed is equal to the third convergence speed, that is, an AE convergence speed is restored to the AE convergence speed in the preview stage at the capture moment.

After the AE module reduces the convergence speed to the third convergence speed. In an aspect, the AE module executes the AE algorithm at the third convergence speed, and outputs the image control parameter to the CIS, so that the CIS obtains a subsequent image based on the image control parameter. In another aspect, the AE module determines an AE convergence status by invoking an interface for determining an AE convergence status (CheckAEConvergeStatus), and reports the AE convergence status (AE convergence, or AE convergence in progress) to an upper layer (an application framework layer). An upper layer determines whether to trigger the camera to shoot based on the AE convergence status.

Figure 8:
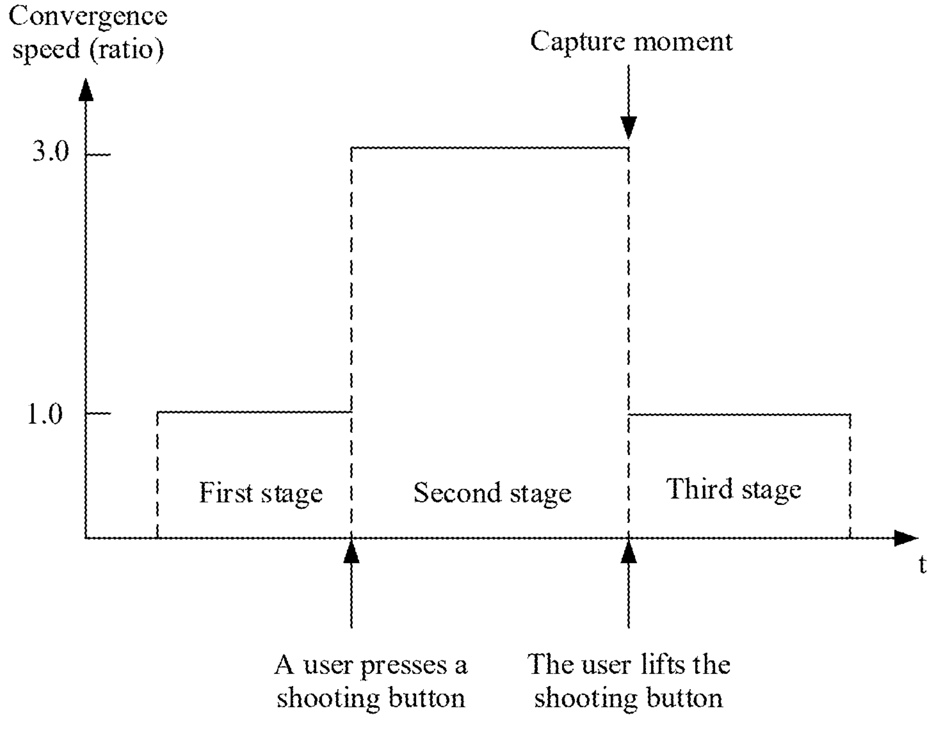
FIG. 8 is a schematic diagram of a target luminance interval according to an embodiment of this application.

As an example, the CheckAEConvergeStatus interface is configured with a new target luminance interval. For example, FIG. 8 is a schematic diagram of a target luminance interval according to an embodiment of this application. As shown in FIG. 8, the first target luminance interval is marked as [L-thd1, L+thd1], and the first target luminance interval is an existing target luminance interval. The new target luminance interval is a second target luminance interval and is marked as [L-thd2, L+thd2], where L represents target luminance corresponding to the current shooting environment, thd1 and thd2 are both numbers greater than 0, and thd1<thd2. It can be seen from FIG. 8 that the second target luminance interval includes the first target luminance interval.

Optionally, thd1=L*0.05, and thd2=L*0.1.

The first target luminance interval is used for the AE module to determine whether an image control parameter such as an exposure time and a gain needs to be adjusted, and if image luminance converges to the first target luminance interval, the AE module does not need to execute the AE algorithm, and does not need to adjust the image control parameter such as an exposure time and a gain; or if the image luminance does not converge to the first target luminance interval, the AE module executes the AE algorithm to adjust the image control parameter such as an exposure time and a gain.

The second target luminance interval is used for the AE module to determine an AE convergence status. If the image luminance converges to the second target luminance interval, the AE module determines that AE converges; or if the image luminance does not converge to the second target luminance interval, the AE module determines that AE convergence is in progress. For each frame image, the AE module reports an AE convergence status to the upper layer (application framework layer).

Based on above example, the AE module invokes the CheckAEConvergeStatus interface, determines the AE convergence status based on the second target luminance interval, and reports the AE convergence status to the upper layer. In the second stage, the convergence speed of the AE algorithm is improved, and a wider target luminance interval (the second target luminance interval) is configured to determine an AE convergence status of an image. Therefore, when the user lifts the shooting button, luminance of the tenth frame image collected by the CIS can quickly converge to the second target luminance interval. The AE module reports AE convergence to an upper layer, to trigger the upper layer to control the camera to shoot, and captures the tenth frame image to the album of the mobile phone. The tenth frame image is a preview image at a desired moment of the user.

The following summarizes configuration of the convergence speed in executing an algorithm of the AE module in the foregoing embodiments.

Figure 9:
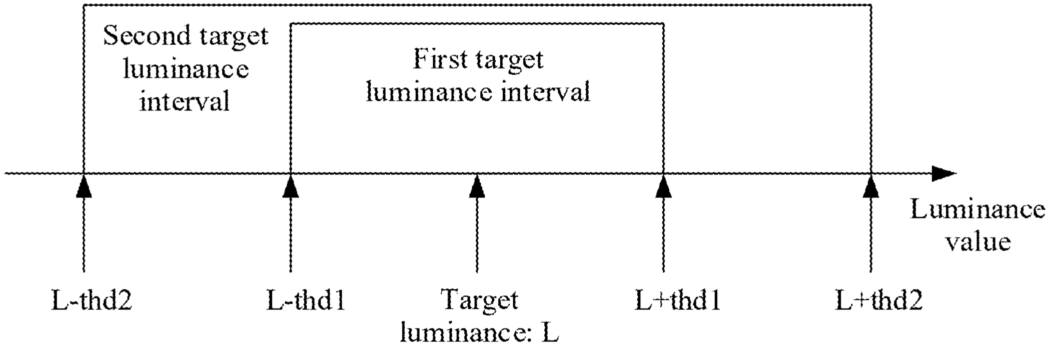
FIG. 9 is a schematic diagram of configuration of a convergence speed of an AE algorithm according to an embodiment of this application.

For example, FIG. 9 is a schematic diagram of configuration of a convergence speed of an AE algorithm according to an embodiment of this application. As shown in FIG. 9, a stage before the user presses the shooting button is the first stage, and the image frames collected by the CIS in the first stage include, for example, the first frame to the sixth frame in FIG. 7. In the first stage, the AE module executes the AE algorithm at an original convergence speed (for example, ratio=1.0), and adjusts an image control parameter, to adjust image luminance of a subsequent image. A state from a moment at which the user presses the shooting button to a moment at which the user lifts the shooting button is the second stage, and image frames collected by the CIS in the second stage include, for example, the seventh frame to the ninth frame in FIG. 7. In the second stage, the AE module executes the AE algorithm at 3 times the original convergence speed (for example, ratio=3.0), and adjusts an image control parameter, to accelerate adjustment of image luminance of a subsequent image. A moment at which the user lifts the shooting button is the capture moment. An image frame collected by the CIS at the capture moment may be the tenth frame in FIG. 7. A state after the capture moment is a third stage, and an image frame collected by the CIS in the third stage may be an image frame after the tenth frame in FIG. 7. At the capture moment and in the third stage, the AE module resumes the original convergence speed (namely, ratio=1.0).

In the above example, the AE module adjusts the convergence speed of the AE algorithm in the second stage by invoking the interface SetAEConvergeRatio for accelerating the AE convergence, so that luminance of an image can converge to the second target luminance interval at a capture moment, and the AE can directly report that AE converges, so as to trigger the camera to shoot, and enable the user to capture an image at a desired moment.

It should be noted that the convergence speed of the AE algorithm corresponding to the second stage configured in the foregoing example is only an example, as long as the convergence speed is greater than 1.0, which is not limited in this embodiment. In some embodiments, the AE convergence speed may alternatively be configured to be less than 1.0 to slow down the AE convergence speed.

It should be further noted that the foregoing configuring of the convergence speed of the AE algorithm may be extended to configuring of a convergence speed of the AF algorithm and configuring of a convergence speed of the AWB algorithm. Correspondingly, the AF module can adjust a convergence speed of the AF algorithm in the second stage through invoking an interface for accelerating AF convergence, so that the AF can reach a higher convergence level at the capture moment, to capture image content with high sharpness at the shooting moment. Correspondingly, the AWB module can adjust a convergence speed of the AWB algorithm in the second stage through invoking an interface for accelerating AWB convergence, so that the AWB can reach a higher convergence level at the capture moment, to capture image content with appropriate white balance at the shooting moment.

An embodiment of this application further provides a test system. The test system includes a first device, and a second device. The first device is a device to be tested, and the first device can be used for executing the shooting method in the described embodiments. The second device is an image collection device, and the second device may be used for recording image data displayed on a screen of the first device when a user uses the first device to shoot a person or object in a moving state. For example, the first device may be a smartphone, and the second device may be a high-speed camera.

In this embodiment, a high-speed camera can record a plurality of frames of image at a very high frequency in a moving state, for example, 3000 frames are recorded per second, and if a 30 fps player is used to play a video recorded by the high-speed camera, image frames recorded in is can be played for 100 s, so that a moment corresponding to each frame of image can be accurately recorded.

Based on the described test system, an embodiment of this application provides a test method, and main steps of the method are as follows: A user uses a baffle to shield a camera of the first device, and then starts a camera application of the first device; the user uses the high-speed camera to record a screen change of the first device; after removing the baffle, the user quickly clicks a shooting button; recording a screen of the first device is stopped after shooting is completed, and screen recording data is obtained from the second device; and luminance information about each frame of image is obtained from the screen recording data, and an image luminance change curve of the screen recording data is determined based on the luminance information about each frame of image in the screen recording data. The image luminance change curve may be used to determine whether the first device executes the shooting method proposed in the foregoing embodiments.

It should be noted that, the luminance information of each frame of image in the screen recording data mainly refers to luminance information of each frame of image displayed on the screen of the first device in the screen recording data, that is, the image luminance change curve of the screen recording data indicates a luminance change of image frames displayed on the screen of the first device in a whole shooting process from a moment at which the user starts the camera application to a moment at which the user clicks shooting.

Alternatively, a luminance change speed of adjacent image frames in the screen recording data is determined by the following formula:

$$\text{ConvergeSpeed} = |\text{luma}(n+1) - \text{luma}(n)|/\text{luma}(n)$$

In the formula, ConvergeSpeed indicates a luminance change speed of an $(n+1)^{th}$ frame image and an $n^{th}$ frame image that are adjacent, luma(n+1) indicates luminance in average of the $(n+1)^{th}$ frame image, and luma(n) indicates luminance of the $n^{th}$ frame image in average.

It should be noted that, the luminance change speed of adjacent image frames in the screen recording data refers to a luminance change speed of adjacent image frames displayed on the screen of the first device in the screen recording data, and the luminance change speed of adjacent image frame may indirectly indicate a convergence speed of an image control algorithm (for example, an AE algorithm, an AF algorithm, and an AWB algorithm) of the first device. It can be understood that, a faster convergence speed of the image control algorithm of the first device indicates a higher luminance change speed of adjacent image frames collected by the first device.

Figures 10, 11:
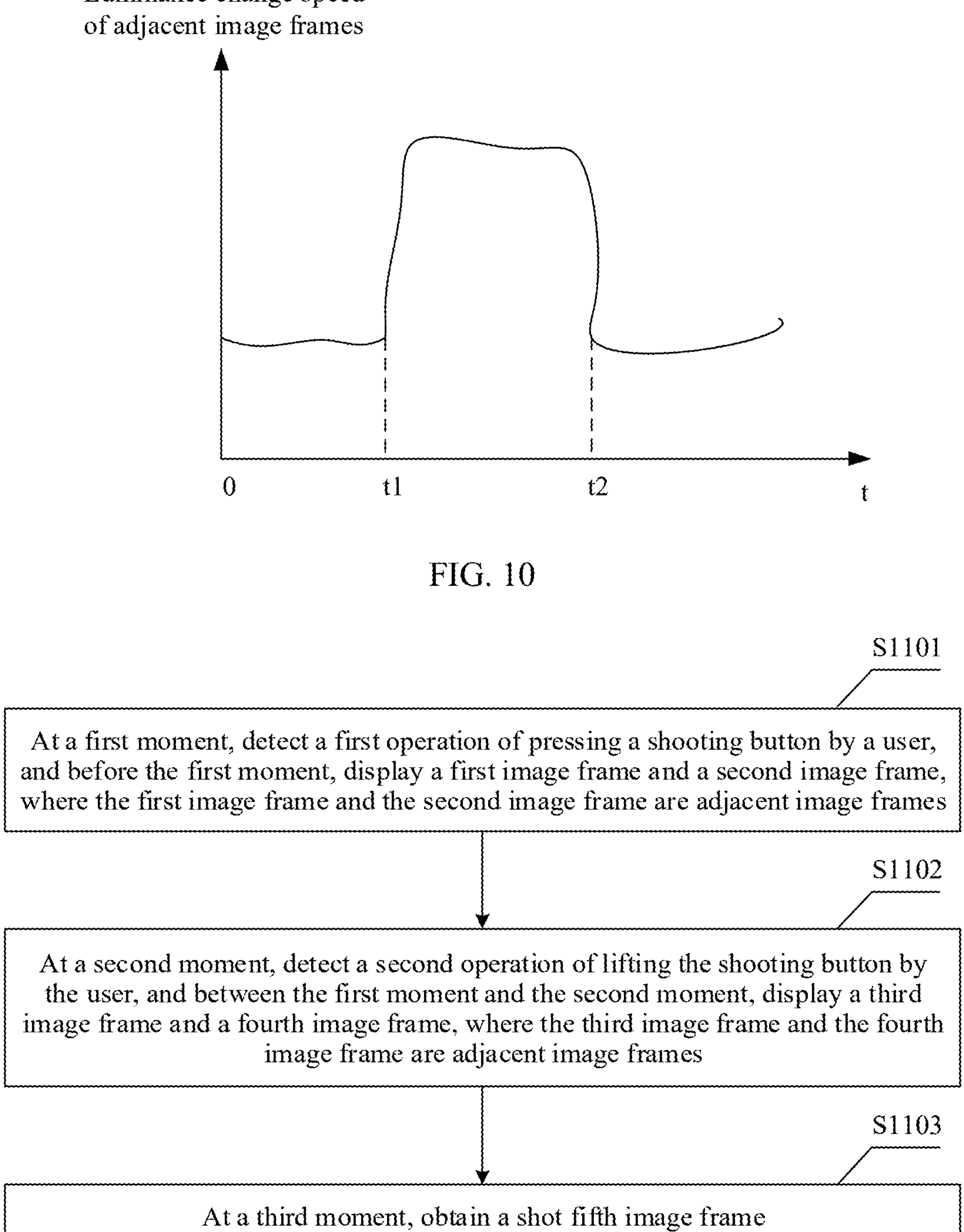
FIG. 10 is a schematic diagram of an image luminance change curve of screen recording data according to an embodiment of this application.
FIG. 11 is a schematic flowchart of a shooting method according to an embodiment of this application.

For example, FIG. 10 is a schematic diagram of an image luminance change curve of screen recording data according to an embodiment of this application. As shown in FIG. 10, if a luminance change speed in a specific time period (a time period from t1 to t2 in FIG. 10) of the image luminance change curve is significantly greater than luminance change speeds in other time periods (a time period from 0 to t1 in FIG. 10 and a time period after t2), it can be determined that the first device executes the shooting method provided by embodiments of this application.

For example, FIG. 11 is a schematic flowchart of a shooting method according to an embodiment of this application. The shooting method is applied to an electronic device. The electronic device may be the first device in the foregoing test method, such as a mobile phone.

As shown in FIG. 11, the shooting method may include the following steps.

S1101: At a first moment, detect a first operation of pressing a shooting button by a user, and before the first moment, display a first image frame and a second image frame, where the first image frame and the second image frame are adjacent image frames.

S1102: At a second moment, detect a second operation of lifting the shooting button by the user, and between the first moment and the second moment, display a third image frame and a fourth image frame, where the third image frame and the fourth image frame are adjacent image frames.

S1103: At a third moment, obtain a shot fifth image frame.

The second moment is later than the first moment, and the third moment is later than the second moment; and a luminance change speed of the third image frame and the fourth image frame is greater than a luminance change speed of the first image frame and the second image frame.

The first image frame and the second image frame are adjacent image frames displayed by a device in a preview stage, for example, the first frame and the second frame in FIG. 7. The third image frame and the fourth image frame are adjacent image frames displayed by the device in a shooting stage triggered by the user, for example, the eighth frame and the ninth frame in FIG. 7. The fifth image frame is an image frame collected by the device at a moment at which the user lifts the shooting button, for example, the tenth frame in FIG. 7.

In the described solution, a luminance change of adjacent image frames in the shooting stage triggered by the user is greater than a luminance change of adjacent image frames in the preview stage, which indirectly indicates a speed at which a bottom layer of the device adjusts luminance of an image frame in the shooting state triggered by the user is greater than a speed at which the bottom layer of the device adjusts luminance of an image frame in the preview stage. To be specific, in the shooting state triggered by the user, a convergence speed of an algorithm for adjusting luminance of an image frame is accelerated by the device. In this way, image luminance of the fifth image frame collected by the device can converge to a luminance interval corresponding to a current shooting environment, so that the device can be triggered to shoot at the third moment to obtain the fifth image frame, and an image frame actually shot by the device is an image frame collected by the device at a shooting moment triggered by the user. This reduces a shooting delay and improves shooting experience of the user.

As an example, the luminance change speed of the first image frame and the second image frame may be a ratio of an absolute value of a difference value between a value of average luminance of the first image frame and a value of average luminance of the second image frame to the value of the average luminance of the first image frame. The luminance change speed of the third image frame and the fourth image frame may be a ratio of an absolute value of a difference value between a value of average luminance of the third image frame and a value of average luminance of the fourth image frame to the value of the average luminance of the third image frame.

As an example, the shooting method is applicable to a shooting scenario with an ambient luminance change, for example:

At a fourth moment, ambient luminance is a first luminance; at a fifth moment, the ambient luminance changes from the first luminance to a second luminance; and the fifth moment is later than the fourth moment, the first moment is later than the fifth moment, and the second luminance is higher than the first luminance.

In this example, the fourth moment may be a moment after the user uses the baffle to block the camera of the first device and starts the camera application of the first device. The fifth moment may be a moment at which the user removes the baffle. It can be understood that after the user removes the baffle, ambient luminance is increased, that is, the second luminance is higher than the first luminance.

In the shooting scenario shown in this example, before the electronic device detects the first moment at which the user presses the shooting button, ambient luminance changes, for example, a dim light environment is changed to a bright light environment for the user. In the shooting scenario, the electronic device needs to adjust a camera parameter based on the change in ambient luminance, so that image luminance of an image frame collected by the camera converges to a luminance interval corresponding to a current shooting environment as soon as possible, to reduce a shooting delay of the device.

As an example, the foregoing shooting method is applicable to a shooting scenario in which ambient luminance is stable but a shooting object (for example, a person or an object) is in a moving state. That is, at the first moment, the second moment, the third moment, and after the third moment, ambient luminance is maintained at the first luminance, and consecutive image frames collected by the electronic device, for example, the first image frame and the second image frame, the third image frame and the fourth image frame, and the fifth image frame all includes a shooting object. In the shooting scenario, luminance change of the consecutive image frames mainly refers to luminance change of an image block corresponding to the shooting object in the continuous image frames. The electronic device needs to adjust the camera parameter based on a luminance change of the shooting object, so that luminance of an image of the shooting object in an image frame collected by the camera converges to a luminance interval corresponding to the shooting object in the current shooting environment as soon as possible, to reduce a delay for the device to capture the shooting object in the moving state.

It should be noted that, in any one of the foregoing shooting scenarios, a bottom layer processing method of the electronic device is similar, and for details, refer to the following optional embodiments.

In an optional embodiment, the displaying a first image frame and a second image frame includes:

- obtaining, by an image control module of the electronic device, a sixth image frame from an image sensor of the electronic device, where the sixth image frame is an image frame before the first image frame and the second image frame;
- when the image control module determines that an image parameter of the sixth image frame does not converge to a first target parameter interval, executing, by the image control module, an image control algorithm at a first convergence speed to obtain a first image control parameter;
- collecting, by the image sensor, the first image frame and the second image frame based on the first image control parameter; and
- displaying, by the electronic device, the first image frame and the second image frame.

The first convergence speed may be a default convergence speed of the image control algorithm, for example, the first convergence speed is 1.

It should be noted that the luminance change speed of the first image frame and the second image frame may be used to indicate the first convergence speed.

In the solution above, the electronic device displays the first image frame and the second image frame on a shooting preview interface, the first image frame and the second image frame may be collected based on a first image control parameter determined based on a sixth image frame before the first image frame and the second image frame. The image control module of the electronic device adjusts image parameters of the first image frame and the second image frame after the sixth image frame by analyzing the image parameters of the sixth image frame, for example, image luminance, sharpness, and white balance of the sixth image frame, so that the image parameters of the first image frame and the second image frame can converge to an image parameter interval corresponding to a current shooting environment as soon as possible.

As an example, the image control module is an AE module, the image control algorithm is an AE algorithm, the image parameter is image luminance, the first target parameter interval is a first target luminance interval, and the first image control parameters include an exposure time and a gain. Optionally, the first image control parameter further includes an aperture value.

As an example, an image control module is an AF module, the image control algorithm is an AF algorithm, the image parameter is image sharpness, the first target parameter interval is a first target sharpness interval, and the first image control parameters include a focal length value.

As an example, the image control module is an AWB module, the image control algorithm is an AWB algorithm, the image parameter is an image white balance, the first target parameter interval is a first target white balance interval, and the first image control parameters include a parameter value of the white balance.

In an optional embodiment, the displaying a third image frame and a fourth image frame includes:

obtaining, by the image control module of the electronic device, a seventh image frame from the image sensor of the electronic device, where the seventh image frame is an image frame before the third image frame and the fourth image frame;

when the image control module determines that an image parameter of the seventh image frame does not converge to the first target parameter interval, executing, by the image control module, an image control algorithm at a second convergence speed to obtain a second image control parameter, where the second convergence speed is greater than the first convergence speed;

collecting, by the image sensor, the third image frame and the fourth image frame based on the second image control parameter; and displaying, by the electronic device, the third image frame and the fourth image frame.

The second convergence speed is a pre-configured convergence speed, and is used to accelerate a convergence speed of the image control algorithm. The second convergence speed may be appropriately configured based on an actual application requirement, which is not specifically limited in this embodiment. For example, the second convergence speed is configured to be 3 times the first convergence speed, that is, the second convergence speed is 3.

It should be noted that the luminance change speed of the third image frame and the fourth image frame may be used to indicate the second convergence speed.

In the solution above, the electronic device displays the third image frame and the fourth image frame on a shooting preview interface, the third image frame and the fourth image frame may be collected based on a second image control parameter determined based on a seventh image frame before the third image frame and the fourth image frame. The image control module of the electronic device adjusts image parameters of the third image frame and the fourth image frame after the seventh image frame by analyzing the image parameters of the seventh image frame, for example, image luminance, sharpness, and white balance of the seventh image frame, so that the image parameters of the third image frame and the fourth image frame can converge to the image parameter interval corresponding to a current shooting environment as soon as possible. It should be noted that, in this embodiment, during the time period in which the user presses the shooting button and the user lifts the shooting button, the image control module increases the convergence speed of executing the image control algorithm, so that the image parameter of the fifth image frame collected by the device at a moment at which the user lifts the shooting button can converge to a better level, reducing the shooting delay.

In an optional embodiment, the executing, by the image control module, an image control algorithm at a second convergence speed to obtain a second image control parameter includes: executing, by the image control module, the image control algorithm at the second convergence speed by invoking a first interface to obtain the second image control parameter, where the second convergence speed is configured on the first interface.

In the solution, the first interface is a newly configured interface, and before executing the image control algorithm, the image control module adjusts the convergence speed of the image control algorithm by invoking the first interface, to accelerate adjustment of an image parameter of a subsequent image frame, so that the image parameter of the subsequent image frame converges as soon as possible.

As an example, the image control module is an AE module, the first interface is an interface for accelerating AE convergence, the image control algorithm is an AE algorithm, and the second image control parameters include an exposure time and a gain. Optionally, the second image control parameter further includes an aperture value. For example, the first interface may be SetAEConvergeRatio shown in FIG. 7.

As an example, the image control module is an AF module, the first interface is an interface for accelerating AF convergence, the image control algorithm is an AF algorithm, and the second image control parameter includes a focal length value.

As an example, the image control module is an AWB module, the first interface is an interface for accelerating AWB convergence, the image control algorithm is an AWB algorithm, and the second image control parameter includes a parameter value of AWB.

In an optional embodiment, the shooting method further includes: after the third moment, displaying an eighth image frame and a ninth image frame, where the eighth image frame and the ninth image frame are adjacent image frames; and the luminance change speed of the third image frame and the fourth image frame is greater than a luminance change speed of the eighth image frame and the ninth image frame.

The third image frame and the fourth image frame are adjacent image frames displayed by the device in the shooting stage triggered by the user, for example, the eighth frame and the ninth frame in FIG. 7. The eighth image frame and the ninth image frame are adjacent image frames displayed by the device in the preview stage after shooting is triggered by the user, for example, a twelfth frame and a thirteenth frame after the tenth frame in FIG. 7.

A luminance change of adjacent image frames in the shooting stage triggered by the user is greater than a luminance change of adjacent image frames in the preview stage after shooting is triggered, which indirectly indicates a speed at which a bottom layer of the device adjusts luminance of an image frame in the shooting state triggered by the user is greater than a speed at which the bottom layer of the device adjusts luminance of an image frame in the preview stage after shooting is triggered. That is, after shooting is triggered by the user, the device reduces a convergence speed of an algorithm for adjusting luminance of an image frame to return to, for example, a convergence speed corresponding to a preview stage before triggering shooting, to improve stability and smoothness of the device displaying a preview image.

As an example, the luminance change speed of the eighth image frame and the ninth image frame may be a ratio of an absolute value of a difference value between a value of average luminance of the eighth image frame and a value of average luminance of the ninth image frame to the value of the average luminance of the eighth image frame.

In an optional embodiment, the displaying an eighth image frame and a ninth image frame includes:

obtaining, by the image control module of the electronic device, a tenth image frame from the image sensor of the electronic device, where the tenth image frame is an image frame before the eighth image frame and the ninth image frame;

when the image control module determines that an image parameter of the tenth image frame does not converge to the first target parameter interval, executing, by the image control module, the image control algorithm at a third convergence speed to obtain a third image control parameter, where the third convergence speed is less than the second convergence speed;

collecting, by the image sensor, the eighth image frame and the ninth image frame based on the third image control parameter; and displaying, by the electronic device, the eighth image frame and the ninth image frame.

The eighth image frame and the ninth image frame are adjacent image frames displayed by the device in the preview stage after shooting is triggered by the user, for example, a twelfth frame and a thirteenth frame after the tenth frame in FIG. 7. The tenth image frame is the image frame before the eighth image frame and the ninth image frame, for example, an eleventh image frame in FIG. 7.

Optionally, the third convergence speed is equal to the first convergence speed, for example, the third convergence speed is 1.

It should be noted that, the luminance change speed of the eighth image frame and the ninth image frame may be used to indicate the third convergence speed.

In the solution above, the electronic device displays the eighth image frame and the ninth image frame on the shooting preview interface, the eighth image frame and the ninth image frame may be collected based on the third image control parameter determined based on a tenth image frame before the eighth image frame and the ninth image frame. The image control module of the electronic device adjusts image parameters of the eighth image frame and the ninth image frame after the tenth image frame by analyzing the image parameters of the tenth image frame, for example, image luminance, sharpness, and white balance of the tenth image frame, so that the image parameters of the eighth image frame and the ninth image frame can converge to the image parameter interval corresponding to the current shooting environment as soon as possible. It should be noted that, in this embodiment, after shooting is triggered by the user, the image control module reduces the convergence speed for executing the image control algorithm, for example, executing the image control algorithm at a default convergence speed. This can improve stability and smoothness of the device displaying the preview image.

In an optional embodiment, the obtaining a shot fifth image frame includes:

obtaining, by the image control module of the electronic device, the fifth image frame from the image sensor of the electronic device, where the fifth image frame is an image frame after the third image frame and the fourth image frame;

when the image control module determines that an image parameter of the fifth image frame converges to a second target parameter interval, reporting, by the image control module, an image parameter convergence status of the fifth image frame to a shooting control module of the electronic device, where the second target parameter interval includes the first target parameter interval; and controlling, by the shooting control module, to store the fifth image frame to a target space based on the image parameter convergence status of the fifth image frame.

The fifth image frame is an image frame collected by the device at a moment at which the user lifts the shooting button.

As an example, the target space is a storage space of an album application of the electronic device.

In the above solution, the shooting control module controls to store the fifth image frame based on a status reported by the image control module that the image parameter of the fifth image frame converges. It should be noted that, the image control module determines the convergence status of the image parameter of the fifth image frame based on the newly configured second target parameter interval, and the second target parameter interval is a wider target parameter interval compared with the first target parameter interval. Such configuration can avoid a shooting delay as far as possible. Refer to FIG. 9. For example, the image parameter is image luminance, and the image luminance of the fifth image frame is within an interval (L-thd1, L-thd2). When the image luminance convergence status is determined based on the first target luminance interval, if the image luminance of the fifth image frame does not converge, the shooting control module delays shooting, that is, a captured image frame is an image frame after the fifth image frame. When the image luminance convergence status is determined based on the second target luminance interval, if the image luminance of the fifth image frame converges, the shooting control module stores the fifth image frame in an album as a captured image frame.

As an example, the image control module is the AE module, the image parameter is image luminance, the second target parameter interval is the second target luminance interval, the first target parameter interval is the first target luminance interval, the second target luminance interval includes the first target luminance interval, and the convergence status of the image parameter is a convergence status of the image luminance, for example, an AE convergence status.

As an example, the image control module is the AF module, the image parameter is image sharpness, the second target parameter interval is a second target sharpness interval, the first target parameter interval is a first target sharpness interval, the second target sharpness interval includes the first target sharpness interval, and the convergence status of the image parameters is a convergence status of the image sharpness, for example, an AF convergence status.

As an example, the image control module is the AWB module, the image parameter is image white balance, the second target parameter interval is a second target white balance interval, the first target parameter interval is a first target white balance interval, the second target white balance interval includes the first target white balance interval, and the convergence status of the image parameter is a convergence status of the image white balance, for example, an AWB convergence status.

Figure 12:
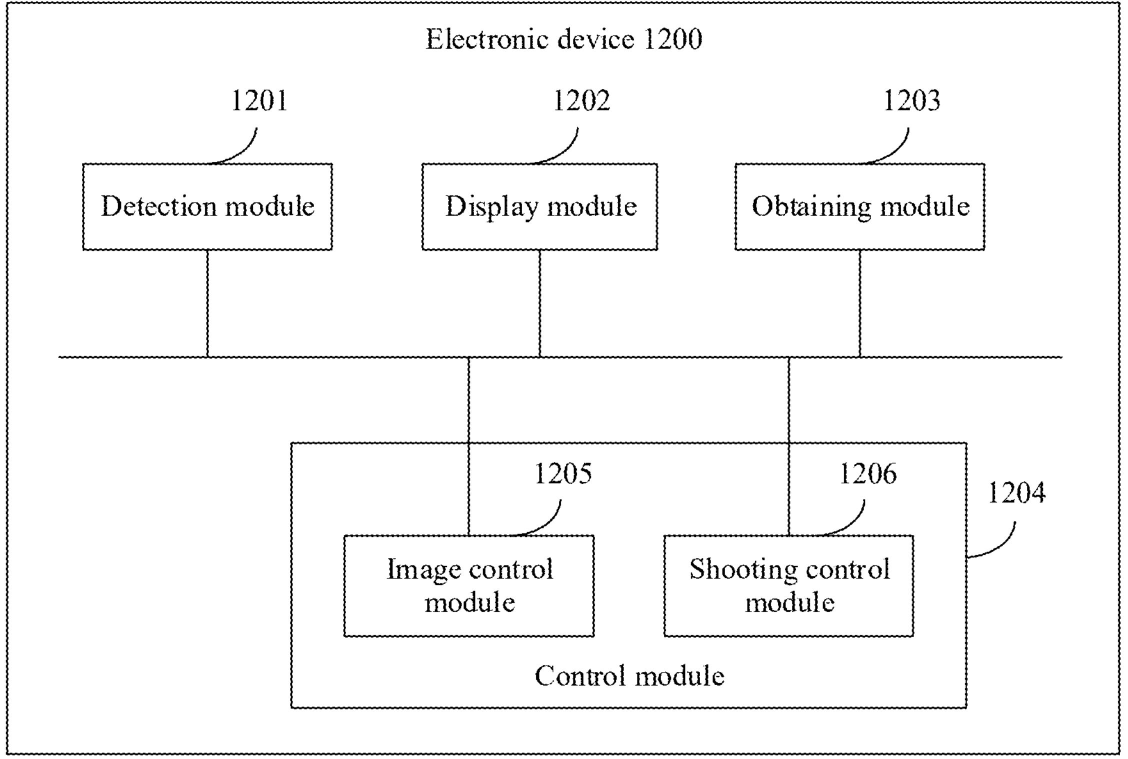
FIG. 12 is a schematic diagram of a structure of an electronic device according to an embodiment of this application.

FIG. 12 is a schematic diagram of a structure of an electronic device according to an embodiment of this application. As shown in FIG. 12, the electronic device of this embodiment includes: a detection module 1201, a display module 1202 and an obtaining module 1203;

at a first moment, the detection module 1201 detects a first operation of pressing a shooting button by a user, and before the first moment, the display module 1202 displays a first image frame and a second image frame, where the first image frame and the second image frame are adjacent image frames;

at a second moment, the detection module 1201 detects a second operation of the user lifting the shooting button, and between the first moment and the second moment, the display module 1202 displays a third image frame and a fourth image frame, where the third image frame and the fourth image frame are adjacent image frames; and at a third moment, the obtaining module 1203 obtains a shot fifth image frame, where the second moment is later than the first moment, and the third moment is later than the second moment; and a luminance change speed of the third image frame and the fourth image frame is greater than a luminance change speed of the first image frame and the second image frame.

In an optional embodiment, the electronic device further includes a control module 1204, where the control module 1204 includes an image control module 1205 and a shooting control module 1206.

The image control module 1205 obtains a sixth image frame from an image sensor, where the sixth image frame is an image frame before the first image frame and the second image frame;

when the image control module 1205 determines that an image parameter of the sixth image frame does not converge to a first target parameter interval, executing, by the image control module 1205, an image control algorithm at a first convergence speed to obtain a first image control parameter;

the image sensor collects the first image frame and the second image frame based on the first image control parameter; and the display module 1202 displays the first image frame and the second image frame.

In an optional embodiment, the image control module 1205 obtains a seventh image frame from the image sensor, where the seventh image frame is an image frame before the third image frame and the fourth image frame;

when the image control module 1205 determines that an image parameter of the seventh image frame does not converge to the first target parameter interval, the image control module 1205 executes an image control algorithm at a second convergence speed to obtain a second image control parameter, where the second convergence speed is greater than the first convergence speed;

the image sensor collects the third image frame and the fourth image frame based on the second image control parameter; and the display module 1202 displays the third image frame and the fourth image frame.

In an optional embodiment, the image control module 1205 executes the image control algorithm at the second convergence speed by invoking a first interface to obtain the second image control parameter, where the second convergence speed is configured on the first interface.

In an optional embodiment, after the third moment, the display module 1202 displays an eighth image frame and a ninth image frame, where the eighth image frame and the ninth image frame are adjacent image frames; and the luminance change speed of the third image frame and the fourth image frame is greater than a luminance change speed of the eighth image frame and the ninth image frame.

In an optional embodiment, the image control module 1205 obtains a tenth image frame from the image sensor, where the tenth image frame is an image frame before the eighth image frame and the ninth image frame;

when the image control module 1205 determines that an image parameter of the tenth image frame does not converge to the first target parameter interval, the image control module 1205 executes the image control algorithm at a third convergence speed to obtain a third image control parameter, where the third convergence speed is less than the second convergence speed;

the image sensor collects the eighth image frame and the ninth image frame based on the third image control parameter; and the display module 1202 displays the eighth image frame and the ninth image frame.

In an optional embodiment, the image control module 1205 obtains a fifth image frame from the image sensor, where the fifth image frame is an image frame after the third image frame and the fourth image frame;

when the image control module 1205 determines that an image parameter of the fifth image frame converges to a second target parameter interval, the image control module 1205 reports an image parameter convergence status of the fifth image frame to the shooting control module 1206, where the second target parameter interval includes the first target parameter interval; and the shooting control module 1206 controls to store the fifth image frame to a target space based on the image parameter convergence status of the fifth image frame.

In the foregoing embodiments, "module" may be a software program, a hardware circuit, or a combination of the foregoing functions. The hardware circuit may include an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function.

Therefore, the example modules, algorithms, and steps described with reference to embodiments in this application can be implemented by electronic hardware or a combination of computer software and electronic hardware. Whether the functions are performed by hardware or software depends on particular applications and design constraints of the technical solutions. A person skilled in the art can use different methods to implement the described functions for each particular application, but it should not be considered that the implementation goes beyond the scope of embodiments of this application.

An embodiment of this application further provides an electronic device. The electronic device includes a memory, a processor and a computer program. The computer program is stored in a memory and is configured to be executed by a processor to implement the technical solutions of any one of the foregoing method embodiments. Implementation principles and technical effects of the computer program are similar. Details are not described herein.

The memory may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto.

The memory may exist independently, and is connected to the processor by using a communication line. The memory may also be integrated with the processor.

The processor may be a general-purpose central processing unit (CPU), a microprocessor, an application-specific integrated circuit (ASIC), or one or more integrated circuits configured to control program execution of the solutions of this application.

An embodiment of this application further provides a computer-readable storage medium. The computer-readable storage medium stores computer instructions. When the computer instructions are run on an electronic device, the electronic device is enabled to perform the technology solutions of the foregoing embodiments. Implementation principles and technical effects of the computer-readable storage medium are similar to implementation principles and technical effects of the described related embodiments. Details are not repeated herein.

An embodiment of this application provides a chip. The chip includes a processor. The processor is used for invoking a computer program in a memory, to execute technical solutions in the described embodiments. Implementation principles and technical effects of the chip are similar to implementation principles and technical effects of the described related embodiments. Details are not repeated herein.

An embodiment of this application provides a computer program product. When the computer program product is run on an electronic device, the electronic device is enabled to perform the technology solutions of the foregoing embodiments. Implementation principles and technical effects of the electronic device are similar to implementation principles and technical effects of the described related embodiments. Details are not repeated herein.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

The invention claimed is:

1. A method, comprising:

displaying a first image frame and a second image frame before a first moment, wherein at the first moment, a first operation of pressing a shooting button by a user is detected, and wherein the first image frame and the second image frame are adjacent image frames;

displaying a third image frame and a fourth image frame between the first moment and a second moment, wherein at the second moment, a second operation of lifting the shooting button by the user is detected, and wherein the third image frame and the fourth image frame are adjacent image frames; and obtaining a shot fifth image frame at a third moment, wherein the second moment is later than the first moment, and wherein the third moment is later than the second moment, wherein a luminance change speed of the third image frame and the fourth image frame is greater than a luminance change speed of the first image frame and the second image frame.

2. The method of claim 1, wherein based on the first operation, a convergence speed of luminance of an image displayed on a preview interface after the first moment is greater than a convergence speed of luminance of an image displayed on the preview interface before the first moment, and wherein the image displayed on the preview interface before the first moment comprises the first image frame and the second image frame, and the image displayed on the preview interface after the first moment comprises the third image frame and the fourth image frame.

3. The method of claim 2, wherein displaying the first image frame and the second image frame comprises:

obtaining, by an image control module, a sixth image frame from an image sensor, wherein the sixth image frame is an image frame before the first image frame and the second image frame;

executing, by the image control module when an image parameter of the sixth image frame does not converge to a first target parameter interval, an image control algorithm at a first convergence speed to obtain a first image control parameter;

collecting, by the image sensor, the first image frame and the second image frame based on the first image control parameter; and displaying the first image frame and the second image frame.

4. The method of claim 3, wherein displaying the third image frame and the fourth image frame comprises:

obtaining, by the image control module, a seventh image frame from the image sensor, wherein the seventh image frame is an image frame before the third image frame and the fourth image frame;

executing, by the image control module when an image parameter of the seventh image frame does not converge to the first target parameter interval, an image control algorithm at a second convergence speed to obtain a second image control parameter, wherein the second convergence speed is greater than the first convergence speed;

collecting, by the image sensor, the third image frame and the fourth image frame based on the second image control parameter; and displaying the third image frame and the fourth image frame.

5. The method of claim 4, wherein executing the image control algorithm at the second convergence speed to obtain the second image control parameter comprises executing the image control algorithm at the second convergence speed by invoking a first interface to obtain the second image control parameter, wherein the second convergence speed is configured on the first interface.

6. The method of claim 3, wherein obtaining the shot fifth image frame comprises:

obtaining, by the image control module, the fifth image frame from the image sensor, wherein the fifth image frame is an image frame after the third image frame and the fourth image frame;

reporting, by the image control module when an image parameter of the fifth image frame converges to a second target parameter interval, an image parameter convergence status of the fifth image frame to a shooting control module, wherein the second target parameter interval comprises the first target parameter interval; and storing, by the shooting control module, the fifth image frame to a target space based on the image parameter convergence status of the fifth image frame.

7. The method of claim 1, further comprising displaying an eighth image frame and a ninth image frame after the second moment, wherein the eighth image frame and the ninth image frame are adjacent image frames, and wherein the luminance change speed of the third image frame and the fourth image frame is greater than a luminance change speed of the eighth image frame and the ninth image frame.

8. The method of claim 7, wherein a convergence speed of luminance of an image displayed on a preview interface after the second moment is less than a convergence speed of luminance of an image displayed on the preview interface between the first moment and the second moment, and wherein the image displayed on the preview interface after the second moment comprises the eighth image frame and the ninth image frame, and the image displayed on the preview interface between the first moment and the second moment comprises the third image frame and the fourth image frame.

9. The method of claim 7, wherein displaying the eighth image frame and the ninth image frame comprises:

obtaining, by an image control module, a tenth image frame from an image sensor, wherein the tenth image frame is an image frame before the eighth image frame and the ninth image frame;

executing, by the image control module when an image parameter of the tenth image frame does not converge to a first target parameter interval, an image control algorithm at a third convergence speed to obtain a third image control parameter;

collecting, by the image sensor, the eighth image frame and the ninth image frame based on the third image control parameter; and displaying the eighth image frame and the ninth image frame.

10. The method of claim 1, further comprising increasing a luminance change speed of a shooting preview interface in response to the first operation, wherein the first image frame, the second image frame, the third image frame, and the fourth image frame are displayed on the shooting preview interface.

11. An electronic device, comprising:

one or more processors and a memory coupled to the one or more processors, wherein the memory is configured to store instructions that, when executed by the one or more processors, cause the electronic device to be configured to:

display a first image frame and a second image frame before a first moment, wherein at the first moment, a first operation of pressing a shooting button by a user is detected, and wherein the first image frame and the second image frame are adjacent image frames;

display a third image frame and a fourth image frame between the first moment and a second moment, wherein at the second moment, a second operation of lifting the shooting button by the user is detected, and wherein the third image frame and the fourth image frame are adjacent image frames; and obtain a shot fifth image frame at a third moment, wherein the second moment is later than the first moment, and wherein the third moment is later than the second moment, wherein a luminance change speed of the third image frame and the fourth image frame is greater than a luminance change speed of the first image frame and the second image frame.

12. The electronic device of claim 11, wherein based on the first operation, a convergence speed of luminance of an image displayed on a preview interface after the first moment is greater than a convergence speed of luminance of an image displayed on the preview interface before the first moment, and wherein the image displayed on the preview interface before the first moment comprises the first image frame and the second image frame, and the image displayed on the preview interface after the first moment comprises the third image frame and the fourth image frame.

13. The electronic device of claim 12, wherein displaying the first image frame and the second image frame comprises:

obtaining, by an image control module, a sixth image frame from an image sensor, wherein the sixth image frame is an image frame before the first image frame and the second image frame;

executing, by the image control module when an image parameter of the sixth image frame does not converge to a first target parameter interval, an image control algorithm at a first convergence speed to obtain a first image control parameter;

collecting, by the image sensor, the first image frame and the second image frame based on the first image control parameter; and displaying the first image frame and the second image frame.

14. The electronic device of claim 13, wherein displaying the third image frame and the fourth image frame comprises:

obtaining, by the image control module, a seventh image frame from the image sensor, wherein the seventh image frame is an image frame before the third image frame and the fourth image frame;

executing, by the image control module when an image parameter of the seventh image frame does not converge to the first target parameter interval, an image control algorithm at a second convergence speed to obtain a second image control parameter, wherein the second convergence speed is greater than the first convergence speed;

collecting, by the image sensor, the third image frame and the fourth image frame based on the second image control parameter; and displaying the third image frame and the fourth image frame.

15. The electronic device of claim 14, wherein executing the image control algorithm at the second convergence speed to obtain the second image control parameter comprises executing the image control algorithm at the second convergence speed by invoking a first interface to obtain the second image control parameter, wherein the second convergence speed is configured on the first interface.

16. The electronic device of claim 14, wherein the instructions, when executed by the one or more processors, cause the electronic device to be further configured to display an eighth image frame and a ninth image frame after the second moment, wherein the eighth image frame and the ninth image frame are adjacent image frames, and wherein the luminance change speed of the third image frame and the fourth image frame is greater than a luminance change speed of the eighth image frame and the ninth image frame.

17. The electronic device of claim 16, wherein a convergence speed of luminance of an image displayed on the preview interface after the second moment is less than a convergence speed of luminance of an image displayed on the preview interface between the first moment and the second moment, and wherein the image displayed on the preview interface after the second moment comprises the eighth image frame and the ninth image frame, and the image displayed on the preview interface between the first moment and the second moment comprises the third image frame and the fourth image frame.

18. The electronic device of claim 16, wherein displaying the eighth image frame and the ninth image frame comprises:

obtaining, by the image control module, a tenth image frame from the image sensor, wherein the tenth image frame is an image frame before the eighth image frame and the ninth image frame;

executing, by the image control module when an image parameter of the tenth image frame does not converge to the first target parameter interval, the image control algorithm at a third convergence speed to obtain a third image control parameter, wherein the third convergence speed is less than the second convergence speed;

collecting, by the image sensor, the eighth image frame and the ninth image frame based on the third image control parameter; and displaying the eighth image frame and the ninth image frame.

19. The electronic device of claim 13, wherein obtaining the shot fifth image frame comprises:

obtaining, by the image control module, the fifth image frame from the image sensor, wherein the fifth image frame is an image frame after the third image frame and the fourth image frame;

reporting, by the image control module when an image parameter of the fifth image frame converges to a second target parameter interval, an image parameter convergence status of the fifth image frame to a shooting control module, wherein the second target parameter interval comprises the first target parameter interval; and storing, by the shooting control module, the fifth image frame to a target space based on the image parameter convergence status of the fifth image frame.

20. A non-transitory computer-readable storage medium storing instructions that, when executed by one or more processors of an electronic device, cause the electronic device to be configured to:

display a first image frame and a second image frame before a first moment, wherein at the first moment, a first operation of pressing a shooting button by a user is detected, and wherein the first image frame and the second image frame are adjacent image frames;

display a third image frame and a fourth image frame between the first moment and a second moment, wherein at the second moment, a second operation of lifting the shooting button by the user is detected, and wherein the third image frame and the fourth image frame are adjacent image frames; and obtain a shot fifth image frame at a third moment, wherein the second moment is later than the first moment, and wherein the third moment is later than the second moment, wherein a luminance change speed of the third image frame and the fourth image frame is greater than a luminance change speed of the first image frame and the second image frame.

* * * * *